US006824867B2

(12) United States Patent
Hayashi et al.

(10) Patent No.: US 6,824,867 B2
(45) Date of Patent: Nov. 30, 2004

(54) NON-MAGNETIC COMPOSITE PARTICLES, PROCESS FOR PRODUCING THE SAME AND MAGNETIC RECORDING MEDIUM USING THE SAME

(75) Inventors: Kazuyuki Hayashi, Hiroshima (JP); Keisuke Iwasaki, Hiroshima (JP); Hiroko Morii, Hiroshima (JP); Mineko Ohsugi, Hiroshima (JP)

(73) Assignee: Toda Kogyo Corporation, Hiroshima (JP)

( * ) Notice: Subject to any disclaimer, the term of this patent is extended or adjusted under 35 U.S.C. 154(b) by 0 days.

(21) Appl. No.: 10/355,058

(22) Filed: Jan. 31, 2003

(65) Prior Publication Data

US 2003/0198811 A1 Oct. 23, 2003

Related U.S. Application Data

(62) Division of application No. 09/625,404, filed on Jul. 25, 2000, now Pat. No. 6,544,647.

(30) Foreign Application Priority Data

Jul. 26, 1999 (JP) ............................................ 11-210321

(51) Int. Cl.$^7$ ................................................. G11B 5/70
(52) U.S. Cl. ........................ 428/323; 428/403; 428/405; 428/407; 428/694 BS; 428/694 BN
(58) Field of Search ................................. 428/323, 403, 428/405, 407, 694 BS, 694 BN, 404, 212; 427/205, 219, 226, 344, 387, 215

(56) References Cited

U.S. PATENT DOCUMENTS

| 5,286,291 | A | 2/1994 | Bernhardt et al. |
| 5,489,466 | A | 2/1996 | Inaba et al. |
| 5,902,569 | A | 5/1999 | Oshima et al. |
| 6,130,017 | A | 10/2000 | Hayashi et al. |
| 6,251,555 | B1 | 6/2001 | Hayashi et al. |

FOREIGN PATENT DOCUMENTS

| EP | 0 908 494 A2 | 4/1999 |
| EP | 0 913 431 A2 | 5/1999 |
| EP | 0 924 690 A2 | 6/1999 |

*Primary Examiner*—Kevin M. Bernatz
(74) *Attorney, Agent, or Firm*—Nixon & Vanderhye P.C.

(57) ABSTRACT

Non-magnetic composite particles composed of non-magnetic core particles having an average particle size of 0.01 to 0.3 μm, and inorganic fine particles having an average particle size of 0.001 to 0.07 μm. The fine particles are present in an amount of 0.1 to 20% by weight based on the weight of the non-magnetic particles are on the surface of each non-magnetic particle, and are fixed or anchored on the surface of each non-magnetic particle through a silicon compound The non-magnetic composite particles have a high polishing effect and a high dispersibility, and are useful as a non-magnetic undercoat layer for a magnetic recording medium.

6 Claims, No Drawings

NON-MAGNETIC COMPOSITE PARTICLES, PROCESS FOR PRODUCING THE SAME AND MAGNETIC RECORDING MEDIUM USING THE SAME

CROSS-REFERENCE TO RELATED APPLICATION

This application is a division of U.S. Pat. No. 6,544,647 issued Apr. 8, 2003 (formerly Ser. No. 09/625,404, filed Jul. 25, 2000), the entire content of which is hereby incorporated by reference in this application.

BACKGROUND OF THE INVENTION

The present invention relates to non-magnetic composite particles, a process for producing the non-magnetic composite particles, and a magnetic recording medium using the non-magnetic composite particles. More particularly, the present invention relates to non-magnetic composite particles having a high polishing effect and a high dispersibility, a magnetic recording medium which is provided with a non-magnetic undercoat layer using the above non-magnetic composite particles, and has an excellent durability and a sufficient surface smoothness, a non-magnetic substrate containing the non-magnetic composite particles, and a process for producing the non-magnetic composite particles.

With the recent tendency toward miniaturization and weight-reduction of video or audio magnetic recording and reproducing apparatuses as well as prolonged recording time of these apparatuses, magnetic recording media such as magnetic tapes or magnetic discs have been strongly required to have a high performance, namely, high recording density, high output characteristics such as, especially, improved frequency characteristics, low noise level or the like.

In particular, recent video tapes have been also required to exhibit higher picture quality, so that the frequencies of carrier signals recorded thereon are shifted to shorter wavelength region (short wave-recording) as compared to those used for conventional video tapes. As a result, the magnetization depth from the surface of the magnetic tape has become remarkably shallow.

In order to improve the high output characteristics, especially, the S/N ratio of a magnetic recording medium when short-wavelength signals are recorded thereon, it has been strongly required to reduce the thickness of a magnetic recording layer of the magnetic recording medium. In order to reduce the thickness of the magnetic recording layer, it is necessary to smoothen the surface of the magnetic recording layer and lessen the un-uniformity of thickness thereof. To meet these requirements, it is also required to smoothen the surface of a base film used in the magnetic recording medium.

With the recent tendency toward reduction in thickness of the magnetic recording layer, in order to solve conventional problems such as poor surface properties and deteriorated electromagnetic performance of the magnetic recording layer, there has been proposed and put into practice a method of providing at least one undercoat layer comprising a binder resin and non-magnetic particles dispersed therein (hereinafter referred to merely as "non-magnetic undercoat layer") on a non-magnetic base film (Japanese Patent Publication (KOKOKU) No. 6-93297(1994), and Japanese Patent Application Laid-Open (KOKAI) Nos. 62-159338 (1987), 63-187418(1988), 4-167225(1992), 4-325915 (1992), 5-73882(1993) and 5-182177(1993)).

However, these non-magnetic undercoat layers have been strongly required to have further improved surface smoothness. For this reason, it has been attempted to improve the dispersibility of acicular hematite particles used as non-magnetic particles in the non-magnetic undercoat layer.

In addition, the reduced thickness of the magnetic recording layer causes deterioration in durability of the magnetic recording medium itself. Therefore, it has also been strongly required to enhance the durability of the magnetic recording medium.

In order to enhance the durability of the magnetic recording medium itself, abrasives, e.g., oxide particles such as alumina, are added to the magnetic layer or non-magnetic undercoat layer thereof. However, the addition of these abrasives causes many problems. For instance, it is known that alumina has a poor dispersibility in binder resins. Therefore, when a large amount of alumina is added to these layers, there arise defects such as increased dropouts and deteriorated surface smoothness of the obtained magnetic recording medium. In consequence, it has been demanded to provide a non-magnetic undercoat layer and non-magnetic particles used therefor which are capable of imparting a sufficient durability to the obtained magnetic recording medium even when the magnetic recording layer has a small thickness and the amount of abrasives added such as alumina is reduced.

Conventionally, in order to improve various properties of non-magnetic particles, there are known non-magnetic particles having a surface coat composed of an Si compound or an Al compound (Japanese Patent Application Laid-Open (KOKAI) Nos. 5-182177(1993), 5-347017(1993), 6-60362 (1994), 10-21532(1998), 10-320753(1993), etc.), or non-magnetic particles on the surface of which fine particles of an Al compound or an Si compound are adhered (Japanese Patent Application Laid-Open (KOKAI) No. 7-192248 (1995), etc.).

The non-magnetic particles having a surface coat composed of an Si compound or an Al compound as described in Japanese Patent Application Laid-Open (KOKAI) Nos. 5-182177(1993), 5-347017(1993), 6-60362(1994), 10-21532(1998) and 10-320753(1993) exhibit an improved dispersibility. However, when these non-magnetic particles are used for a non-magnetic undercoat layer, the obtained magnetic recording medium has an insufficient durability. Therefore, the use of these non-magnetic particles cannot reduce the content of abrasives in the magnetic recording medium.

Also, in Japanese Patent Application Laid-Open (KOKAI) No. 7-192248(1995), there is described a method of precipitating fine particles of an oxide or hydroxide of Al or Si on the surface of each non-magnetic particle and then fixing the fine particles thereon by compaction and pulverization treatments. However, as shown in Comparative Examples hereinafter, a considerable amount of the fine particles are desorbed or fallen-off from the surface of each non-magnetic particle. Therefore, when the non-magnetic particles are used for a non-magnetic undercoat layer of a magnetic recording medium, the dispersibility thereof is unsatisfactory, so that the obtained magnetic recording medium cannot show a sufficient durability. Accordingly, the use of such non-magnetic particles cannot reduce the content of abrasives in the magnetic recording medium.

As a result of the present inventors' earnest studies for solving the above problems, it has been found that by mixing non-magnetic particles having an average particle size of 0.01 to 0.3 $\mu$m with inorganic fine particles having an average particle size of 0.001 to 0.07 $\mu$m; adhering the inorganic fine particles onto the surface of each non-magnetic particle; adding tetraalkoxysilanes to the obtained particles; and then heating the resultant mixture at a temperature of 40 to 200° C. to fix or anchor the inorganic fine particles onto the surface of each magnetic particle through a silicon compound derived from the tetraalkoxysilanes, the thus obtained non-magnetic composite particles are free from desorption or falling-off of the inorganic fine particles from the surface of each non-magnetic particle, and as a result, can show an excellent dispersibility and a high polishing effect. The present invention has been attained on the basis of this finding.

SUMMARY OF THE INVENTION

It is an object of the present invention to provide non-magnetic composite particles for a non-magnetic undercoat layer of a magnetic recording medium, which can exhibit not only an excellent dispersibility but also an excellent polishing effect by firmly fixing or anchoring inorganic fine particles on the surface of each non-magnetic particle.

It is another object of the present invention to provide a non-magnetic substrate for a high-density magnetic recording medium which is excellent in durability and surface smoothness.

It is still another object of the present invention to provide a high-density magnetic recording medium exhibiting excellent durability and surface smoothness.

To accomplish the aims, in a first aspect of the present invention, there are provided non-magnetic composite particles comprising:

(a) non-magnetic particles as core particles having an average particle size of 0.01 to 0.3 $\mu$m; and (b) inorganic fine particles having an average particle size of 0.001 to 0.07 $\mu$m, which are present on the surface of each non-magnetic particle, and comprise at least one inorganic compound selected from the group consisting of oxides, nitrides, carbides and sulfides containing aluminum element, zirconium element, cerium element, titanium element, silicon element, boron element or molybdenum element, the said inorganic fine particles being fixed or anchored on the surface of each non-magnetic particle through a silicon compound derived from tetraalkoxysilanes and the amount of the inorganic fine particles being 0.1 to 20% by weight based on the weight of the non-magnetic particles.

In a second aspect of the present invention, there are provided non-magnetic composite particles comprising:

(a) non-magnetic particles as core particles having an average particle size of 0.01 to 0.3 $\mu$m;

(a1) an undercoat formed on the surface of each non-magnetic particle as core particle and comprising at least one compound selected from the group consisting of a hydroxide of aluminum, an oxide of aluminum, a hydroxide of silicon and an oxide of silicon; and (b) inorganic fine particles having an average particle size of 0.001 to 0.07 $\mu$m, which are present on the surface of the undercoat, and comprise at least one inorganic compound selected from the group consisting of oxides, nitrides, carbides and sulfides containing aluminum element, zirconium element, cerium element, titanium element, silicon element, boron element or molybdenum element, the said inorganic fine particles being fixed or anchored on the surface of each non-magnetic particle through a silicon compound derived from tetraalkoxysilanes and the amount of the inorganic fine particles being 0.1 to 20% by weight based on the weight of the non-magnetic particles.

In a third aspect of the present invention, there is provided a non-magnetic substrate for magnetic recording medium, comprising:

(1) a base film; and (2) a non-magnetic undercoat layer formed on the base film, comprising a binder resin and non-magnetic composite particles comprising:

(a) non-magnetic particles as core particles having an average particle size of 0.01 to 0.3 $\mu$m; and (b) inorganic fine particles having an average particle size of 0.001 to 0.07 $\mu$m, which are present on the surface of each non-magnetic particle, and comprise at least one inorganic compound selected from the group consisting of oxides, nitrides, carbides and sulfides containing aluminum element, zirconium element, cerium element, titanium element, silicon element, boron element or molybdenum element, the said inorganic fine particles being fixed or anchored on the surface of each non-magnetic particle through a silicon compound derived from tetraalkoxysilanes and the amount of the inorganic fine particles being 0.1 to 20% by weight based on the weight of the non-magnetic particles.

In a fourth aspect of the present invention, there is provided a non-magnetic substrate for magnetic recording medium, comprising:

(1) a base film; and (2) a non-magnetic undercoat layer formed on the base film, comprising a binder resin and non-magnetic composite particles comprising:

(a) non-magnetic particles as core particles having an average particle size of 0.01 to 0.3 $\mu$m;

(a1) an undercoat formed on the surface of each non-magnetic particle as core particle and comprising at least one compound selected from the group consisting of a hydroxide of aluminum, an oxide of aluminum, a hydroxide of silicon and an oxide of silicon; and (b) inorganic fine particles having an average particle size of 0.001 to 0.07 $\mu$m, which are present on the surface of the undercoat, and comprise at least one inorganic compound selected from the group consisting of oxides, nitrides, carbides and sulfides containing aluminum element, zirconium element, cerium element, titanium element, silicon element, boron element or molybdenum element, the said inorganic fine particles being fixed or anchored on the surface of each non-magnetic particle through a silicon compound derived from tetraalkoxysilanes and the amount of the inorganic fine particles being 0.1 to 20% by weight based on the weight of the non-magnetic particles.

In a fifth aspect of the present invention, there is provided a magnetic recording medium comprising:

(1) a non-magnetic base film;

(2) a non-magnetic undercoat layer formed on the base film, comprising a binder resin and non-magnetic composite particles; and (3) a magnetic recording layer formed on the non-magnetic undercoat layer, comprising magnetic particles and a binder resin, the said non-magnetic composite particles comprising:

(a) non-magnetic particles as core particles having an average particle size of 0.01 to 0.3 $\mu$m; and (b) inorganic fine particles having an average particle size of 0.001 to 0.07 $\mu$m, which are present on the surface of each non-magnetic particle, and comprise at least one inorganic compound selected from the group consisting of oxides, nitrides, carbides and sulfides containing aluminum element, zirconium element, cerium element, titanium element, silicon element, boron element or molybdenum element, the said inorganic fine particles being fixed or anchored on the surface of each non-magnetic particle through a silicon compound derived from tetraalkoxysilanes and the amount of the inorganic fine particles being 0.1 to 20% by weight based on the weight of the non-magnetic particles.

In a sixth aspect of the present invention, there is provided a magnetic recording medium comprising:

(1) a non-magnetic base film;

(2) a non-magnetic undercoat layer formed on the base film, comprising a binder resin and non-magnetic composite particles; and (3) a magnetic recording layer formed on the non-magnetic undercoat layer, comprising magnetic particles and a binder resin, the said non-magnetic composite particles comprising:

(a) non-magnetic particles as core particles having an average particle size of 0.01 to 0.3 μm;

(a1) an undercoat formed on the surface of each non-magnetic particle as core particle and comprising at least one compound selected from the group consisting of a hydroxide of aluminum, an oxide of aluminum, a hydroxide of silicon and an oxide of silicon; and (b) inorganic fine particles having an average particle size of 0.001 to 0.07 μm, which are present on the surface of the undercoat, and comprise at least one inorganic compound selected from the group consisting of oxides, nitrides, carbides and sulfides containing aluminum element, zirconium element, cerium element, titanium element, silicon element, boron element or molybdenum element, the said inorganic fine particles being fixed or anchored on the surface of each non-magnetic particle through a silicon compound derived from tetraalkoxysilanes and the amount of the inorganic fine particles being 0.1 to 20% by weight based on the weight of the non-magnetic particles.

In a seventh aspect of the present invention, there is provided a process for producing the non-magnetic composite particles as defined in the first aspect, comprising:

(i) mixing non-magnetic particles having an average particle size of 0.01 to 0.3 μm with inorganic fine particles having an average particle size of 0.001 to 0.07 μm, and comprising at least one inorganic compound selected from the group consisting of oxides, nitrides, carbides and sulfides containing aluminum element, zirconium element, cerium element, titanium element, silicon element, boron element or molybdenum element, to adhere the inorganic fine particles onto the surface of each non-magnetic particle;

(ii) adding tetraalkoxysilanes to the resultant particles; and (iii) heating the obtained mixture at a temperature of 40 to 200° C., thereby fixing or anchoring the inorganic fine particles onto the surface of each non-magnetic particle through a silicon compound derived from the tetraalkoxysilanes.

DETAILED DESCRIPTION OF THE INVENTION

The present invention will be described in detail below.

First, the non-magnetic composite particles according to the present invention are explained.

The non-magnetic composite particles of the present invention, comprise magnetic particles as core particles having an average particle size of 0.01 to 0.3 μm; and inorganic fine particles adhered onto the surface of each magnetic particle, which have an average particle size of 0.001 to 0.07 μm and comprise at least one inorganic compound selected from the group consisting of oxides, nitrides, carbides and sulfides containing aluminum element, zirconium element, cerium element, titanium element, silicon element, boron element or molybdenum element. The inorganic fine particles are firmly fixed or anchored onto the surface of each magnetic particle through a silicon compound derived from tetraalkoxysilane.

As the non-magnetic particles, acicular hematite particles, acicular iron oxide hydroxide particles and the like may be exemplified.

The non-magnetic particles as core particles used in the present invention may have either an acicular shape. The "acicular" non-magnetic particles include "spindle-shaped" particles, "rice grain-shaped" particles and the like in addition to literally "needle-like" particles.

The non-magnetic particles as core particles have an average major axial diameter of usually 0.01 to 0.3 μm, preferably 0.02 to 0.2 μm.

When the average major axial diameter of the non-magnetic particles as core particles is more than 0.3 μm, the obtained non-magnetic composite particles may become coarse. When such coarse particles are used to form a non-magnetic undercoat layer of magnetic recording medium, the obtained non-magnetic undercoat layer may be deteriorated in surface smoothness. When the average major axial diameter of the non-magnetic particles is less than 0.01 μm, the non-magnetic particles may become extremely fine, so that the agglomeration of the non-magnetic particles tends to occur due to the increased intermolecular force therebetween. As a result, it is difficult to uniformly adhere the inorganic fine particles onto the surface of each non-magnetic particle and evenly fix or anchor the inorganic fine particles thereonto through the silicon compound derived (produced) from tetraalkoxysilane.

The ratio of an average major axial diameter to an average minor axial diameter (hereinafter referred to merely as "aspect ratio") of the acicular non-magnetic particles is usually 2:1 to 15:1, preferably 3:1 to 10:1.

When the aspect ratio of the acicular non-magnetic particles is more than 15:1, the non-magnetic particles may tend to be entangled or intertwined with each other. As a result, it may be difficult to uniformly adhere the inorganic fine particles onto the surface of each non-magnetic particle and evenly fix or anchor the inorganic fine particles thereonto through the silicon compound derived from tetraalkoxysilane. When the aspect ratio of the acicular non-magnetic particles is less than 2:1, the obtained non-magnetic undercoat layer may be deteriorated in strength.

The non-magnetic particles as core particles used in the present invention have preferably a geometrical standard deviation of major axial diameter of usually not more than 2.0, more preferably not more than 1.8, still more preferably not more than 1.6. When the geometrical standard deviation of particle size of the non-magnetic particles is more than 2.0, coarse particles may exist in the non-magnetic particles, thereby inhibiting the non-magnetic particles from being uniformly dispersed. As a result, it may be difficult to uniformly adhere the inorganic fine particles onto the surface of each non-magnetic particle and evenly fix or anchor the inorganic fine particles thereonto through the silicon compound derived from tetraalkoxysilane. The lower limit of the geometrical standard deviation is usually 1.01. It is difficult to industrially produce non-magnetic particles having a geometrical standard deviation of particle size of less than 1.01.

The non-magnetic particles as core particles used in the present invention have a BET specific surface area of usually 15 to 150 m²/g, preferably 20 to 120 m²/g, more preferably 25 to 100 m²/g. When the BET specific surface area value of the non-magnetic particles is less than 15 m²/g, the non-magnetic particles may become too coarse or the sintering therebetween tends to be caused, resulting in the production of coarse non-magnetic composite particles. When such coarse non-magnetic composite particles are used to form a non-magnetic undercoat layer, the obtained coating layer may be deteriorated in surface smoothness. When the BET specific surface area value of the non-magnetic particles is more than 150 m²/g, the non-magnetic particles may become extremely fine, so that the agglomeration of the particles tends to occur due to the increased intermolecular force therebetween. As a result, it is difficult to uniformly adhere the inorganic fine particles onto the surface of each non-magnetic particle and evenly fix or anchor the inorganic fine particles thereon through the silicon compound derived from tetraalkoxysilane.

The non-magnetic particles as core particles used in the present invention have a volume resistivity value of usually not more than $5.0 \times 10^9$ Ω·cm.

The shape and size of the non-magnetic composite particles according to the present invention varies depending upon those of the non-magnetic particles as core particles, and are analogous thereto.

The non-magnetic composite particles according to the present invention have an average major axial diameter of usually 0.01 to 0.3 μm, preferably 0.02 to 0.2 μm.

When the average major axial diameter of the non-magnetic composite particles according to the present invention is more than 0.3 μm, the particle size become large, so that the non-magnetic undercoat layer formed by using the non-magnetic composite particles tends to have a deteriorated surface smoothness. When the average major axial diameter of the non-magnetic composite particles is less than 0.01 μm, the particles become extremely fine and tend to be agglomerated together due to the increased intermolecular force therebetween, resulting in poor dispersibility in vehicle upon the production of a non-magnetic coating composition.

The non-magnetic composite particles according to the present invention have an aspect ratio of usually 2:1 to 15:1, preferably 3:1 to 10:1.

When the aspect ratio of the non-magnetic composite particles is more than 15:1, the particles may tend to be entangled and intertwined with each other, sometimes resulting in poor dispersibility in vehicle upon the production of a non-magnetic coating composition and increased viscosity of the obtained non-magnetic coating composition. When the aspect ratio of the non-magnetic composite particles is less than 2:1, the non-magnetic undercoat layer of the magnetic recording medium may be deteriorated in strength.

The geometrical standard deviation of particle size of the non-magnetic composite particles according to the present invention is usually not more than 2.0. When the geometrical standard deviation is more than 2.0, a large amount of coarse particles may be present in the non-magnetic composite particles, thereby adversely affecting the surface smoothness of the non-magnetic undercoat layer formed on the non-magnetic base film. In the consideration of the surface smoothness of the obtained non-magnetic undercoat layer, the geometrical standard deviation of particle size of the non-magnetic composite particles is preferably not more than 1.8, more preferably not more than 1.6. Further, in the consideration of industrial productivity, the lower limit of the geometrical standard deviation is usually 1.01, because it is industrially difficult to produce non-magnetic composite particles having a geometrical standard deviation of particle size of less than 1.01.

The non-magnetic composite particles according to the present invention have a BET specific surface area of usually 16 to 160 m²/g, preferably 21 to 130 m²/g, more preferably 26 to 110 m²/g. When the BET specific surface area of the non-magnetic composite particles is less than 16 m²/g, the non-magnetic composite particles may become coarse or the sintering therebetween tends to be caused. The use of such coarse or sintered non-magnetic composite particles leads to deterioration in surface smoothness of the obtained non-magnetic undercoat layer. When the BET specific surface area of the non-magnetic composite particles is more than 160 m²/g, the non-magnetic composite particles may become extremely fine and tend to be agglomerated together due to the increased intermolecular force therebetween, resulting in poor dispersibility in vehicle upon the production of a non-magnetic coating composition.

The non-magnetic composite particles according to the present invention have a volume resistivity value of usually not more than $1.0 \times 10^{10}$ Ω·cm, preferably $1.0 \times 10^5$ to $9.0 \times 10^9$ Ω·cm, more preferably $1.0 \times 10^5$ to $8.0 \times 10^9$ Ω·cm. When the volume resistivity value is more than $1.0 \times 10^{10}$ Ω·cm, it may be difficult to lower a surface resistivity value of the magnetic recording medium obtained therefrom.

The percentage of the inorganic fine particles desorbed or fallen-off from the non-magnetic composite particles (desorption percentage) is usually not more than 15% by weight, preferably not more than 12% by weight, more preferably not more than 10% by weight based on the weight of the inorganic fine particles, when measured by the method as defined in Examples below. When the desorption percentage is more than 15% by weight, the inorganic fine particles desorbed may tend to inhibit the non-magnetic composite particles from being uniformly dispersed in vehicle, and the obtained magnetic recording medium may fail to show a sufficient durability and magnetic head cleaning property.

The inorganic fine particles of the non-magnetic composite particles are at least one kind of fine particles composed of at least one inorganic compound selected from the group consisting of oxides, nitrides, carbides and sulfides of aluminum, zirconium, cerium, titanium, silicon, boron or molybdenum.

As the inorganic fine particles used in the present invention, there may be exemplified (a) oxide fine particles such as aluminum oxide fine particles, zirconium oxide fine particles, cerium oxide fine particles, titanium oxide fine particles, silicon oxide fine particles, molybdenum oxide fine particles or the like; (b) nitride fine particles such as aluminum nitride fine particles, titanium nitride fine particles, silicon nitride fine particles, zirconium nitride fine particles, molybdenum nitride fine particles, boron nitride fine particles or the like; (c) carbide fine particles such as aluminum carbide fine particles, silicon carbide fine particles, zirconium carbide fine particles, cerium carbide fine particles, titanium carbide fine particles, boron carbide fine particles, molybdenum carbide fine particles or the like; and (d) sulfide fine particles such as aluminum sulfide fine particles, zirconium sulfide fine particles, titanium sulfide fine particles, silicon sulfide fine particles, molybdenum disulfide fine particles or the like.

In the consideration of the durability of the obtained magnetic recording medium, it is preferred to use at least one fine particles selected from aluminum oxide fine particles, zirconium oxide fine particles, cerium oxide fine particles, aluminum nitride fine particles, titanium nitride fine particles, silicon nitride fine particles, zirconium nitride fine particles, boron nitride fine particles, silicon carbide fine particles, zirconium carbide fine particles, titanium carbide fine particles, boron carbide fine particles, molybdenum carbide fine particles.

The inorganic fine particles used in the present invention have an average particle size of usually 0.001 to 0.07 μm, preferably 0.002 to 0.05 μm.

When the average particle size of the inorganic fine particles is less than 0.001 μm, the particles become extremely fine, resulting in poor handling thereof. When the average particle size of the inorganic fine particles is more than 0.07 μm, the particle size of the inorganic fine particles is too large as compared to that of the non-magnetic particles as core particles, so that the adhesion of the inorganic fine particles onto the non-magnetic particles becomes insufficient.

The amount of the inorganic fine particles adhered onto the non-magnetic particles is usually 0.1 to 20% by weight based on the weight of the non-magnetic particles as core particles.

When the amount of the inorganic fine particles adhered is less than 0.1% by weight, it is difficult to obtain non-magnetic composite particles showing a sufficient polishing effect, due to the too small amount of the inorganic fine particles adhered. On the contrary, when the amount of the inorganic fine particles adhered is more than 20% by weight, the obtained non-magnetic composite particles show a sufficient polishing effect. However, since the amount of the inorganic fine particles adhered is too large, the inorganic fine particles tend to be desorbed or fallen-off from the surface of each non-magnetic particle, thereby failing to obtain non-magnetic undercoat layer having an excellent durability. The amount of the inorganic fine particles adhered onto the non-magnetic particles is preferably 0.15 to 15% by weight, more preferably 0.2 to 10% by weight based on the weight of the non-magnetic particles as core particles.

The silicon compound through which the inorganic fine particles are fixed or anchored onto the surface of each non-magnetic particle is produced by heat-treating tetraalkoxysilanes represented by the following general formula:

$$SiX_4$$

wherein X represents —OR wherein R is $C_1$–$C_5$ alkyl group.

Examples of the tetraalkoxysilanes may include tetramethoxysilane, tetraethoxysilane, tetrapropoxysilane, tetrabutoxysilane, tetrapentyloxysilane or the like. Among these tetraalkoxysilanes, in the consideration of the anchoring effect of the inorganic fine particles, tetramethoxysilane and tetraethoxysilane are preferred.

The coating amount of the silicon compound produced from tetraalkoxysilane is usually 0.01 to 5.0% by weight, preferably 0.02 to 4.0% by weight, more preferably 0.03 to 3.0% by weight (calculated as Si) based on the weight of the non-magnetic composite particles.

When the coating amount of the silicon compound is less than 0.01% by weight, the inorganic fine particles may not be sufficiently fixed or anchored onto the surface of each non-magnetic particle through the silicon compound derived therefrom and, therefore, tend to be desorbed therefrom, thereby failing to obtain magnetic recording media having an excellent durability and magnetic head cleaning property. When the coating amount of the silicon compound derived from the tetraalkoxysilane is 0.01 to 5.0% by weight, the inorganic fine particles can be sufficiently fixed or anchored onto the surface of each non-magnetic particle. Therefore, it is meaningless to use the silicon compound in an amount of more than 5.0% by weight.

In the non-magnetic composite particles according to the present invention, the non-magnetic particles as core particles may be preliminarily coated with an undercoating material composed of at least one compound selected from the group consisting of a hydroxide of aluminum, an oxide of aluminum, a hydroxide of silicon and an oxide of silicon (hereinafter referred to as "hydroxides and/or oxides of aluminum and/or silicon"). The formation of such an undercoat is more advantageous to enhance the dispersibility of the non-magnetic composite particles in vehicle as compared to those having no undercoat.

The amount of the undercoat is preferably 0.01 to 20% by weight (calculated as Al, $SiO_2$ or a sum of Al and $SiO_2$) based on the weight of the non-magnetic particles coated with the undercoat.

When the covering amount of the undercoat is less than 0.01% by weight, it may be difficult to obtain the effect of improving the desorption percentage of inorganic fine particles. When the covering amount of the undercoat is 0.01 to 20% by weight, a sufficient effect of improving the desorption percentage of inorganic fine particles can be obtained. Therefore, it is meaningless to use each non-magnetic particle with the undercoat in an amount of more than 20% by weight.

The non-magnetic composite particles having the undercoat may have the substantially same particle size, geometrical standard deviation value, volume resistivity value and BET specific surface area value as those having no undercoat. By covering each non-magnetic particle with the undercoat, the desorption percentage of the inorganic fine particles can be effectively reduced to preferably not more than 12%, more preferably not more than 10%.

Next, the magnetic recording medium according to the present invention will be described.

The magnetic recording medium according to the present invention comprises:

a non-magnetic substrate comprising a non-magnetic base film, and a non-magnetic undercoat layer formed on the non-magnetic base film, comprising a binder resin and the non-magnetic composite particles; and a magnetic coating film formed on the non-magnetic substrate, comprising a binder resin and magnetic particles.

As the non-magnetic base film, there may be used those ordinarily used for magnetic recording media. Examples of the non-magnetic base film may include films of synthetic resins such as polyethylene terephthalate, polyethylene, polypropylene, polycarbonates, polyethylene naphthalate, polyamides, polyamideimides and polyimides; foils or plates of metals such as aluminum and stainless steel; or various kinds of papers. The thickness of the non-magnetic base film varies depending upon materials used, and is usually 1.0 to 300 μm, preferably 2.0 to 200 μm.

As the non-magnetic base film for magnetic discs, there may be generally used a polyethylene terephthalate film having a thickness of usually 50 to 300 μm, preferably 60 to 200 μm. As the non-magnetic base film for magnetic tapes, there may be used a polyethylene terephthalate film having a thickness of usually 3 to 100 μm, preferably 4 to 20 μm, a polyethylene naphthalate film having a thickness of usually 3 to 50 μm, preferably 4 to 20 μm, or a polyamide film having a thickness of usually 2 to 10 μm, preferably 3 to 7 μm.

As the binder resins for the non-magnetic undercoat layer, there may also be used those presently ordinarily used for the production of magnetic recording media. Examples of the binder resins may include vinyl chloride-vinyl acetate copolymer resins, urethane resins, vinyl chloride-vinyl acetate-maleic acid copolymer resins, urethane elastomers, butadiene-acrylonitrile copolymer resins, polyvinyl butyral, cellulose derivatives such as nitrocellulose, polyester resins, synthetic rubber-based resins such as polybutadiene, epoxy resins, polyamide resins, polyisocyanates, electron beam-curable acrylic urethane resins, or mixtures thereof.

The respective binder resins may contain a functional group such as —OH, —COOH, —SO$_3$M, —OPO$_2$M$_2$ and —NH$_2$ wherein M represents H, Na or K. In the consideration of the dispersibility of the non-magnetic composite particles in vehicle upon the production of a non-magnetic coating composition, the use of such binder resins containing —COOH or —SO$_3$M as a functional group is preferred.

The amount of the non-magnetic composite particles in the non-magnetic undercoat layer is usually 5 to 2,000 parts by weight, preferably 100 to 1,000 parts by weight based on 100 parts by weight of the binder resin.

When the amount of the non-magnetic composite particles is less than 5 parts by weight, the non-magnetic composite particles may not be continuously dispersed in a coating layer due to the too small content in a non-magnetic coating composition, resulting in insufficient surface smoothness and strength of the obtained coating layer. When the amount of the non-magnetic composite particles is more than 2,000 parts by weight, the non-magnetic composite particles may not be uniformly dispersed in the non-magnetic coating composition due to the too large content as compared to that of the binder resin. As a result, when such a non-magnetic coating composition is coated onto the non-magnetic base film, it is difficult to obtain a coating film having a sufficient surface smoothness. Further, since the non-magnetic composite particles cannot be sufficiently bonded together by the binder resin, the obtained coating film becomes brittle.

The thickness of the non-magnetic undercoat layer formed on the non-magnetic base film is usually 0.2 to 10 μm. When the thickness of the non-magnetic undercoat layer is less than 0.2 μm, it may become difficult to improve the surface roughness of the non-magnetic base film, and the non-magnetic undercoat layer may tend to have a deteriorated strength. In the consideration of strength of the undercoat layer and reduction in thickness of the resultant magnetic recording medium, the thickness of the non-magnetic undercoat layer is preferably 0.5 to 5 μm.

The non-magnetic recording layer may further contain various additives used in ordinary magnetic recording media such as lubricants, abrasives and anti-static agents.

In case of using the non-magnetic composite particles, in which no hydroxides and/or oxides of aluminum and/or silicon coat is formed on the surface of the non-magnetic particles as core particles, the non-magnetic substrate according to the present invention has a gloss (of the coating film) of usually 176 to 300%, preferably 180 to 300%, more preferably 184 to 300%; a surface roughness Ra (of the coating film) of usually 0.5 to 8.5 nm, preferably 0.5 to 8.0 nm; a Young's modulus (relative value to a commercially available video tape: and AV T-120 produced by Victor Company of Japan, Limited) of usually 124 to 160, preferably 126 to 160; and a surface resistivity of usually $1.0 \times 10^5$ to $1.0 \times 10^{13}$ Ω/cm$^2$, preferably $1.0 \times 10^5$ to $7.5 \times 10^{12}$ Ω/cm$^2$, more preferably $1.0 \times 10^5$ to $5.0 \times 10^{12}$ Ω/cm$^2$.

In case of using the non-magnetic composite particles, in which the hydroxides and/or oxides of aluminum and/or silicon coat is formed on the surface of the non-magnetic particles as core particles, the non-magnetic substrate according to the present invention has a gloss (of the coating film) of usually 180 to 300%, preferably 184 to 300%, more preferably 188 to 300%; a surface roughness Ra (of the coating film) of usually 0.5 to 8.0 nm, preferably 0.5 to 7.5 nm; a Young's modulus (relative value to a commercially available video tape: and AV T-120 produced by Victor Company of Japan, Limited) of usually 126 to 160, preferably 128 to 160; and a surface resistivity of usually $1.0 \times 10^5$ to $1.0 \times 10^{13}$ Ω/cm$^2$, preferably $1.0 \times 10^5$ to $7.5 \times 10^{12}$ Ω/cm$^2$, more preferably $1.0 \times 10^5$ to $5.0 \times 10^{12}$ Ω/cm$^2$.

As the magnetic particles, there may be used Co-coated magnetic iron oxide particles obtained by coating Co or Co and Fe on magnetic iron oxide particles such as maghemite particles ($\gamma$-Fe$_2$O$_3$) or magnetite particles (FeO$_x$.Fe$_2$O$_3$: $0<x\leq1$); Co-coated magnetic iron oxide particles obtained by incorporating at least one selected from elements other than Fe such as Co, Al, Ni, P, Zn, Si, B and rare earth metals in the above Co-coated magnetic iron oxide particles; acicular magnetic metal particles containing iron as a main component; acicular magnetic iron alloy particles containing at least one selected from elements other than Fe such as Co, Al, Ni, P, Zn, Si, B and rare earth metals; plate-like magnetoplumbite-type ferrite particles containing Ba, Sr or Ba—Sr; or plate-like magnetoplumbite-type ferrite particles obtained by incorporating at least one coercive force-reducing agent selected from the group consisting of divalent and tetravalent metals such as Co, Ni, Zn, Mn, Mg, Ti, Sn, Zr, Nb, Cu and Mo in the above plate-like magnetoplumbite-type ferrite particles.

In the consideration of the recent tendency toward high-density recording on magnetic recording media, as the magnetic particles, there may be suitably used the acicular magnetic metal particles containing iron as a main component and the acicular magnetic iron alloy particles containing at least one selected from elements other than Fe such as Co, Al, Ni, P, Zn, Si, B and rare earth metals.

More specifically, the magnetic acicular metal particles containing iron as a main component and acicular magnetic iron alloy particles containing elements other than Fe such as Co, Al, Ni, P, Zn, Si, B and rare earth metals may be exemplified as follows.

1) Magnetic acicular metal particles comprises iron; and cobalt of usually 0.05 to 40% by weight, preferably 1.0 to 35% by weight, more preferably 3 to 30% by weight (calculated as Co) based on the weight of the magnetic acicular metal particles.

2) Magnetic acicular metal particles comprises iron; and aluminum of usually 0.05 to 10% by weight, preferably 0.1 to 7% by weight (calculated as Al) based on the weight of the magnetic acicular metal particles.

3) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and aluminum of usually 0.05 to 10% by weight, preferably 0.1 to 7% by weight (calculated as Al) based on the weight of the magnetic acicular metal particles.

4) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

5) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

6) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

7) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

8) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

9) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

10) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

11) Magnetic acicular metal particles comprises iron; aluminum of usually 0.05 to 10% by weight, preferably 0.1 to 7% by weight (calculated as Al) based on the weight of the magnetic acicular metal particles; at least one selected from the group consisting of Nd, La and Y of ordinarily 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

12) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

The iron content in the particles is the balance, and is preferably 50 to 99% by weight, more preferably 60 to 95% by weight (calculated as Fe) based on the weight of the magnetic acicular metal particles containing iron as a main component.

The magnetic particles used in the present invention have an average major axis diameter of usually 0.01 to 0.50 $\mu$m, preferably 0.03 to 0.30 $\mu$m, an average minor axis diameter of usually 0.0007 to 0.17 $\mu$m, preferably 0.003 to 0.10 $\mu$m. It is preferred that the shape of the magnetic particles is acicular or plate-like. The acicular shape may include not only needle-shape but also spindle-shape, rice ball-shape, or the like.

In the case that the shape of the magnetic particles is acicular, the magnetic particles have an aspect ratio of usually not less than 3:1, preferably and not less than 5:1. The upper limit of the aspect ratio is usually 15:1, preferably 10:1 with the consideration of the dispersibility in the vehicle.

In the case that the shape of the magnetic particles is plate-like, the magnetic particles have a plate ratio (an average particle size/average plate thickness) of usually not less than 2:1, preferably and not less than 3:1. The upper limit of the plate ratio is usually 20:1, preferably 15:1 with the consideration of the dispersibility in the vehicle.

As to the magnetic properties of the magnetic particles used in the present invention, the coercive force is usually 500 to 4000 Oe (39.8 to 318.3 kA/m), preferably 550 to 4000 Oe (43.8 to 318.3 kA/m), and the saturation magnetization is usually 50 to 170 emu/g (50 to 170 Am$^2$/kg), preferably 60 to 170 emu/g (60 to 170 Am$^2$/kg).

With the consideration of the high-density recording of the magnetic recording medium, as to the magnetic properties of the magnetic metal particles containing iron as a main component and the acicular magnetic iron alloy particles used as magnetic particles, the coercive force is usually 800 to 3500 Oe (63.7 to 278.5 kA/m), preferably 900 to 3500 Oe (71.6 to 278.5 kA/m), and the saturation magnetization is usually 90 to 170 emu/g (90 to 170 Am$^2$/kg), preferably 100 to 170 emu/g (100 to 170 Am$^2$/kg).

As the binder resin for the magnetic recording layer, the same binder resin as that used for the production of the non-magnetic undercoat layer is usable.

The thickness of the magnetic recording layer formed on the surface of the non-magnetic undercoat layer is usually in the range of 0.01 to 5.0 μm. When the thickness is less than 0.01 μm, uniform coating may be difficult, so that unfavorable phenomenon such as un-uniformity on the coating surface is observed. On the other hand, when the thickness exceeds 5.0 μm, it may be difficult to obtain desired electromagnetic performance due to an influence of diamagnetism. The preferable thickness is in the range of 0.05 to 1.0 μm.

The mixing ratio of the magnetic particles with the binder resin in the magnetic recording layer is usually 200 to 2000 parts by weight, preferably 300 to 1500 parts by weight based on 100 parts by weight of the binder resin.

It is possible to add a lubricant, a polishing agent, an antistatic agent, etc. which are generally used for the production of a magnetic recording medium to the magnetic recording layer in an amount of 0.1 to 50 parts by weight based on 100 parts by weight of the binder resin.

The magnetic recording medium of the present invention has a coercive force value of usually 500 to 4,000 Oe (39.8 to 318.3 kA/m), a squareness (residual magnetic flux density Br/saturation magnetic flux density Bm) of usually 0.85 to 0.95; a gloss of coating film of usually 170 to 300%; a surface roughness Ra of coating film of usually not more than 11.5 nm; a Young's modulus of usually 126 to 160; a surface resistivity value of usually not more than $1.0 \times 10^{10}$ $\Omega/cm^2$; a running durability of usually not less than 22 minutes; and a scratch resistance of usually A or B, when evaluated into four ranks: A (No scratch), B (A few scratches), C (Many scratches) and D (A great many scratches).

When the magnetic recording medium is produced by using the non-magnetic composite particles in which no hydroxides and/or oxides of aluminum and/or silicon coat is formed on the surface of the non-magnetic particles as core particles, the coercive force value thereof is usually 500 to 4,000 Oe (39.8 to 318.3 kA/m), preferably 550 to 4,000 Oe (43.8 to 318.3 kA/m); the squareness (residual magnetic flux density Br/saturation magnetic flux density Bm) thereof is usually 0.85 to 0.95, preferably 0.86 to 0.95; the gloss of coating film thereof is usually 170 to 300%, preferably 175 to 300%; the surface roughness Ra of coating film thereof is usually not more than 11.5 nm, preferably 2.0 to 11.0 nm, more preferably 2.0 to 10.5 nm; the Young's modulus thereof is usually 126 to 160, preferably 128 to 160; the surface resistivity value thereof is usually not more than $1.0 \times 10^{10}$ $\Omega/cm^2$, preferably not more than $9.0 \times 10^9$ $\Omega/cm^2$, more preferably not more than $8.0 \times 10^9$ $\Omega/cm^2$; the running durability thereof is usually not less than 22 minutes, preferably not less than 24 minutes; and the scratch resistance thereof is usually A or B, preferably A when evaluated by the four-rank evaluation method as described below.

When the magnetic recording medium is produced by using the non-magnetic composite particles in which the hydroxides and/or oxides of aluminum and/or silicon coat is formed on the surface of the non-magnetic particles as core particles, the coercive force value thereof is usually 500 to 4,000 Oe (39.8 to 318.3 kA/m), preferably 550 to 4,000 Oe (43.8 to 318.3 kA/m); the squareness (residual magnetic flux density Br/saturation magnetic flux density Bm) thereof is usually 0.85 to 0.95, preferably 0.86 to 0.95; the gloss of coating film thereof is usually 175 to 300%, preferably 180 to 300%; the surface roughness Ra of coating film thereof is usually not more than 11.0 nm, preferably 2.0 to 10.5 nm, more preferably 2.0 to 10.0 nm; the Young's modulus thereof is usually 128 to 160, preferably 130 to 160; the surface resistivity value thereof is usually not more than $1.0 \times 10^{10}$ $\Omega/cm^2$, preferably not more than $9.0 \times 10^9$ $\Omega/cm^2$, more preferably not more than $8.0 \times 10^9$ $\Omega/cm^2$; the running durability thereof is usually not less than 23 minutes, preferably not less than 25 minutes; and the scratch resistance thereof is usually A or B, preferably A when evaluated by the four-rank evaluation method as described below.

Under the consideration of high-density recording, the magnetic recording medium produced by using the magnetic metal particles containing iron as a main component or the acicular magnetic iron alloy particles as the magnetic particles, and the non-magnetic composite particles in which no hydroxides and/or oxides of aluminum and/or silicon coat is formed on the surface of the non-magnetic particles as core particles, has a coercive force value of usually 800 to 3,500 Oe (63.7 to 278.5 kA/m), preferably 900 to 3,500 Oe (71.6 to 278.5 kA/m), a squareness (residual magnetic flux density Br/saturation magnetic flux density Bm) of usually 0.87 to 0.95, preferably 0.88 to 0.95; a gloss of coating film of usually 195 to 300%, preferably 200 to 300%; a surface roughness Ra of coating film of usually not more than 9.0 nm, preferably 2.0 to 8.5 nm, more preferably 2.0 to 8.0 nm; a Young's modulus of usually 128 to 160, preferably 130 to 160; a surface resistivity value of usually not more than $1.0 \times 10^{10}$ $\Omega/cm^2$, preferably not more than $9.0 \times 10^9$ $\Omega/cm^2$, more preferably not more than $8.0 \times 10^9$ $\Omega/cm^2$; a running durability of usually not less than 24 minutes, preferably not less than 26 minutes; and a scratch resistance of B or A, preferably A when evaluated by the four-rank evaluation method as described below.

The magnetic recording medium produced by using the magnetic metal particles containing iron as a main component or the acicular magnetic iron alloy particles as the magnetic particles, and the non-magnetic composite particles in which the hydroxides and/or oxides of aluminum and/or silicon coat is formed on the surface of the non-magnetic particles as core particles, has a coercive force value of usually 800 to 3,500 Oe (63.7 to 278.5 kA/m), preferably 900 to 3,500 Oe (71.6 to 278.5 kA/m), a squareness (residual magnetic flux density Br/saturation magnetic flux density Bm) of usually 0.87 to 0.95, preferably 0.88 to 0.95; a gloss of coating film of usually 200 to 300%, preferably 205 to 300%; a surface roughness Ra of coating film of usually not more than 8.5 nm, preferably 2.0 to 8.0 nm, more preferably 2.0 to 7.5 nm; a Young's modulus of usually 130 to 160, preferably 132 to 160; a surface resistivity value of usually not more than $1.0 \times 10^{10}$ $\Omega/cm^2$, preferably not more than $9.0 \times 10^9$ $\Omega/cm^2$, more preferably not more than $8.0 \times 10^9$ $\Omega/cm^2$; a running durability of usually not less than 25 minutes, preferably not less than 27 minutes; and a scratch resistance of B or A, preferably A when evaluated by the four-rank evaluation method as described below.

Next, the process for producing the non-magnetic composite particles of the present invention will now be described.

The non-magnetic composite particles according to the present invention can be produced by adhering the inorganic fine particles onto the surface of each non-magnetic particle as a core particle, adding tetraalkoxysilane to the non-magnetic particles on which the inorganic fine particles are adhered, and then heat-treating the resultant mixture.

The inorganic fine particles may be adhered onto the surface of each non-magnetic particle as a core particle by the following method. That is, the non-magnetic particles may be mechanically mixed and stirred with the inorganic fine particles composed of at least one inorganic compound selected from the group consisting of oxides, nitrides, carbides and sulfides of aluminum, zirconium, cerium, titanium, silicon, boron or molybdenum, or with an aqueous or alcoholic colloid solution containing the inorganic fine particles, and then the resultant mixture is dried. In the consideration of uniform adhesion of the inorganic fine particles onto the surface of each non-magnetic particle as a core particle, the mixing and stirring with the colloid solution containing the inorganic fine particles are preferred.

As the inorganic fine particles, there may be used either synthesized products or commercially available products.

As the colloid solution containing the inorganic fine particles, there may be exemplified a colloid solution containing fine particles composed of at least one inorganic compound selected from the group consisting of oxides, nitrides, carbides and sulfides of aluminum, zirconium, cerium, titanium, silicon, boron or molybdenum. For example, there may be exemplified a colloid solution containing aluminum oxide, zirconium oxide, cerium dioxide, titanium dioxide, silicon dioxide, aluminum nitride, silicon carbide and molybdenum disulfide.

As the colloid solution containing aluminum oxide fine particles, there may be used an alumina sol (produced by Nissan Kagaku Kogyo Co., Ltd.) or the like.

As the colloid solution containing zirconium oxide fine particles, there may be used NZS-20A, NZS-30A or NZS-30B (tradenames all produced by Nissan Kagaku Kogyo Co., Ltd.) or the like.

As the colloid solution containing cerium oxide fine particles, there may be used a ceria sol (produced by Nissan Kagaku Kogyo Co., Ltd.) or the like.

As the colloid solution containing titanium oxide fine particles, there may be used STS-01 or STS-02 (tradenames both produced by Ishihara Sangyo Co., Ltd.) or the like.

As the colloid solution containing silicon oxide fine particles, there may be used SNOWTEX-XS, SNOWTEX-S, SNOWTEX-UP, SNOWTEX-20, SNOWTEX-30, SNOWTEX-40, SNOWTEX-C, SNOWTEX-N, SNOWTEX-O, SNOWTEX-SS, SNOWTEX-20L or SNOWTEX-OL (tradenames, all produced by Nissan Kagaku Kogyo, Co., Ltd.) or the like.

The amount of the inorganic fine particles which are mechanically mixed and stirred therewith or the inorganic fine particles contained in the colloid solution is preferably 0.1 to 20 parts by weight (calculated as oxide, nitride, carbide or sulfide) based on 100 parts by weight of the non-magnetic particles as core particles. When the amount of the inorganic fine particles is less than 0.1 part by weight, the amount of the inorganic fine particles adhered onto the surface of each non-magnetic particle may be insufficient, so that the obtained non-magnetic composite particles may not show a sufficient polishing effect. When the amount of the inorganic fine particles is more than 20 parts by weight, the obtained non-magnetic composite particles exhibit a sufficient polishing effect. However, since-the amount of the inorganic fine particles adhered onto the surface of each non-magnetic particle is too large, the inorganic fine particles tend to be desorbed or fallen-off from the surfaces of the non-magnetic particles, thereby failing to produce a magnetic recording medium having excellent durability and magnetic head cleaning property.

In order to uniformly adhere the inorganic fine particles onto the surface of each non-magnetic particle as a core particle, it is preferred that aggregated non-magnetic particles be previously deaggregated using a pulverizer.

As apparatus (a) for mixing and stirring the core particles with the inorganic fine particles to adhere onto the surface of each non-magnetic particles as core particles, and (b) for mixing and stirring tetraalkoxysilane with the particles whose the inorganic fine particles are adhered on the respective surfaces, there may be preferably used those apparatus capable of applying a shear force to the particles, more preferably those apparatuses capable of conducting the application of shear force, spaturate force and compressed force at the same time.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

After adhering the inorganic fine particles onto the surface of each non-magnetic particle as a core particle, tetraalkoxysilane is mixed and stirred therewith, and the resultant mixture is then heat-treated so as to fix or anchor the inorganic fine particles onto the non-magnetic particles through a silicon compound derived (produced) from the tetraalkoxysilane.

The conditions of the above mixing or stirring treatment may be appropriately controlled such that the linear load is usually 2 to 200 Kg/cm (19.6 to 1960 N/cm), preferably 10 to 150 Kg/cm (98 to 1470 N/cm), more preferably 15 to 100 Kg/cm (147 to 960 N/cm); and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of tetraalkoxysilane adhered is preferably 0.05 to 70 parts by weight based on 100 parts by weight of the non-magnetic particles as core particles. When the amount of tetraalkoxysilane adhered is less than 0.05 part by weight, it may be difficult to fix or anchor the inorganic fine particles onto the surface of each non-magnetic particle in an amount sufficient to exhibit a good polishing effect and improve a durability. When the amount of tetraalkoxysilane coated is more than 70 parts by weight, it is possible to fix or anchor a sufficient amount of the inorganic fine particles onto the surface of each non-magnetic particle. However, since the fixing or anchoring effect is already saturated, the use of such a too large coating amount of tetraalkoxysilane is meaningless.

The temperature of the heat-treatment of tetraalkoxysilane is usually 40 to 200° C., preferably 60 to 150° C. The heat-treating time is preferably from 10 minutes to 36 hours, more preferably from 30 minutes to 24 hours. Thus, when being heat-treated under the above conditions, tetraalkoxysilane is converted into a suitable silicon compound.

The non-magnetic particles as core particles may be previously coated with an undercoating material composed of at least one compound selected from the group consisting of a hydroxide of aluminum, an oxide of aluminum, a hydroxide of silicon and an oxide of silicon prior to adhering the inorganic fine particles thereonto.

The formation of the undercoat on the surface of the non-magnetic particles may be conducted by adding an aluminum compound, a silicon compound or both aluminum and silicon compounds capable of forming the undercoat, to a water suspension prepared by dispersing the non-magnetic particles in water, mixing and stirring the resultant mixture, and further properly adjusting the pH value of the obtained mixture, if required, thereby coating the surface of each non-magnetic particle with at least one compound selected from the group consisting of a hydroxide of aluminum, an oxide of aluminum, a hydroxide of silicon and an oxide of silicon. The thus obtained mixture is filtered, washed with water, dried and then pulverized. If required, the obtained particles may be further subjected to deaeration, compaction or other treatments.

As the aluminum compounds used for forming the undercoat, there may be exemplified aluminum salts such as aluminum acetate, aluminum sulfate, aluminum chloride and aluminum nitrate; alkali aluminates such as sodium aluminate; or the like.

The amount of the aluminum compound added is usually 0.01 to 20% by weight (calculated as Al) based on the weight of the non-magnetic particles as core particles. When the amount of the aluminum compound added is less than 0.01% by weight, it may be difficult to obtain the effect of improving the desorption percentage of inorganic fine particles. When the amount of the aluminum compound added is more than 20% by weight, the effect of improving the desorption percentage of inorganic fine particles can be obtained. However, since the desorption percentage of inorganic fine particles-reduced effect is already saturated, it is meaningless to coat the non-magnetic particles with such a too large amount of the aluminum compound.

As the silicon compound used for forming the undercoat, there may be exemplified water glass #3, sodium orthosilicate, sodium metasilicate or the like.

The amount of the silicon compound added is usually 0.01 to 20% by weight (calculated as $SiO_2$) based on the weight of the magnetic particles as core particles. When the amount of the silicon compound added is less than 0.01% by weight, it may be difficult to obtain the effect of improving the desorption percentage of inorganic fine particles. When the amount of the silicon compound added is more than 20% by weight, the effect of improving the desorption percentage of inorganic fine particles can be obtained. However, since the desorption percentage of inorganic fine particles-reduced effect is already saturated, it is meaningless to coat the non-magnetic particles with such a too large amount of the silicon compound.

In the case where the aluminum and silicon compounds are used in combination, the total amount of the aluminum and silicon compounds coated is usually 0.01 to 20% by weight (calculated as a sum of Al and $SiO_2$) based on the weight of the non-magnetic particles as core particles.

Next, the process for producing the magnetic recording medium according to the present invention will be described.

The magnetic recording medium according to the present invention can be produced by applying a non-magnetic coating composition comprising the non-magnetic composite particles of the present invention, binder resin and solvent onto a non-magnetic base film to form a coating film, and drying the coating film to form a non-magnetic undercoat layer; and then by applying a magnetic coating composition comprising the magnetic particles, binder resin and solvent onto a non-magnetic undercoat layer to form a coating film, and then drying the coating film to form a magnetic recording layer.

As the solvent for the non-magnetic undercoat layer and magnetic recording layer, there may be used those generally used for the production of ordinary magnetic recording media. Examples of the solvents may include methyl ethyl ketone, toluene, cyclohexanone, methyl isobutyl ketone, tetrahydrofuran or mixtures thereof.

The amount of the solvent or solvents used is 65 to 1,000 parts by weight in total based on 100 parts by weight of the non-magnetic particles or magnetic particles. When the amount of the solvent used is less than 65 parts by weight, the obtained non-magnetic or magnetic coating composition may exhibit a too high viscosity, resulting in poor coatability thereof. When the amount of the solvent used is more than 1,000 parts by weight, a too large amount of the solvent may be volatilized upon coating which is disadvantageous from industrial viewpoints.

The important point of the present invention is that when non-magnetic composite particles obtained by adhering inorganic fine particles of at least one inorganic compound selected from the group consisting of oxides, nitrides, carbides and sulfides of aluminum, zirconium, cerium, titanium, silicon, boron or molybdenum, onto the surface of each non-magnetic particle as a core particle, and firmly fixing or anchoring the inorganic fine particles thereonto through a silicon compound derived (produced) from tetraalkoxysilane are used for the production of a non-magnetic undercoat layer of a magnetic recording medium, the obtained magnetic recording medium exhibits an excellent durability and a sufficient surface smoothness.

The reason why the non-magnetic undercoat layer having an excellent durability can be obtained by using the non-magnetic composite particles according to the present invention as non-magnetic particles therefor, is considered as follows. That is, since the inorganic fine particles having a high Mohs hardness such as oxide fine particles, nitride fine particles, carbide fine particles or sulfide fine particles used as a solid lubricant, are adhered on the surfaces of the non-magnetic particles, and further since these inorganic fine particles are fixed or anchored thereon through the silicon compound derived from tetraalkoxysilane so as to effectively prevent the inorganic fine particles from being desorbed or fallen-off from the surface of each non-magnetic particle, a sufficient polishing effect can be imparted to the non-magnetic particles.

Meanwhile, the reason why the inorganic fine particles are firmly fixed or anchored onto the surface of each non-magnetic particle, is considered as follows. That is, it is known that tetraalkoxysilane is readily hydrolyzed in the presence of water to produce silicon dioxide. In the present invention, the tetraalkoxysilane adhered is hydrolyzed by the interaction with a hydroxyl group derived from water absorbed on the surface of each non-magnetic particle and a hydroxyl group derived from water absorbed on the surfaces of the inorganic fine particles adhered onto the surface of each non-magnetic particle. Further, when the obtained particles are subjected to heat-dehydration, the inorganic fine particles are firmly fixed or anchored on the surface of each non-magnetic particle by the anchoring effect of the silicon compound derived from tetraalkoxysilane.

The reason why the non-magnetic composite particles according to the present invention can exhibit an excellent dispersibility, is considered as follows. That is, since fine irregularities are formed on the surfaces of the non-magnetic particles by adhering the inorganic fine particles thereonto, the contact area between the non-magnetic particles is reduced, and the particles are prevented from being agglomerated together, resulting in improved dispersibility thereof.

The magnetic recording medium provided with the non-magnetic undercoat layer using the non-magnetic composite particles according to the present invention have an excellent durability and a sufficient surface smoothness. The reason why the magnetic recording medium of the present invention can exhibit an excellent surface smoothness is considered as follows. That is, since the obtained non-magnetic undercoat layer has an excellent durability, the content of alumina having a deteriorated dispersibility can be reduced. Further, since the non-magnetic composite particles themselves have an improved dispersibility, the non-magnetic undercoat layer can be enhanced in surface smoothness.

When the non-magnetic composite particles according to the present invention are used for a non-magnetic undercoat layer of a magnetic recording medium, the obtained magnetic recording medium can show excellent durability and surface smoothness. Therefore, the non-magnetic composite particles according to the present invention are suitable as a material for high-density magnetic recording media.

Thus, the magnetic recording medium of the present invention obtained by using the above non-magnetic composite particles as non-magnetic particles for a non-magnetic undercoat layer thereof, can exhibit excellent surface smoothness and durability and, therefore, is suitable as a high-density magnetic recording medium.

EXAMPLES

The present invention is described in more detail by Examples and Comparative Examples, but the Examples are only illustrative and, therefore, not intended to limit the scope of the present invention.

Various properties were measured by the following methods.

(1) The average major axial diameter and average minor axial diameter of particles are respectively expressed by the average value obtained by measuring about 350 particles which were sampled from a micrograph obtained by magnifying an original electron micrograph (×30,000) by four times in each of longitudinal and transverse directions.

(2) The aspect ratio is expressed by the ratio of average major axial diameter to average minor axial diameter. The plate ratio is expressed by the ratio of average particle size to average thickness.

(3) The particle size distribution of major axial diameters is expressed by the geometrical standard deviation thereof obtained by the following method.

That is, the major axial diameters were measured from the above magnified electron micrograph. The actual major axial diameters and the number of the particles were calculated from the measured values. On a logarithmic normal probability paper, the major axial diameters were plotted at regular intervals on the abscissa-axis and the accumulative number (under integration sieve) of particles belonging to each interval of the major axial diameters were plotted by percentage on the ordinate-axis by a statistical technique.

The major axial diameters corresponding to the number of particles of 50% and 84.13%, respectively, were read from the graph, and the geometrical standard deviation was calculated from the following formula:

$$\text{Geometrical standard deviation} = \frac{\{\text{major axial diameter corresponding to 84.13\% under integration sieve}\}}{\{\text{major axial diameter (geometrical average diameter) corresponding to 50\% under integration sieve}\}}$$

The closer to 1 the geometrical standard deviation value, the more excellent the particle size distribution.

(4) The specific surface area is expressed by the value measured by a BET method.

(5) The amounts of Al and Si coated on the surfaces of acicular hematite particles and acicular iron oxide hydroxide particles, the amounts of Al, Zr, Ce, Ti, Mo, B and Si contained in inorganic fine particles existing on the surfaces of the acicular hematite particles and acicular iron oxide hydroxide particles, and the amount of Si contained in a silicon compound derived from tetraalkoxysilane, were respectively measured by a fluorescent X-ray analyzer "3063 M-Model" (manufactured by Rigaku Denki Kogyo Co., Ltd.) according to JIS K0119 "General Rule of Fluorescent X-ray Analysis". Similarly, the amount of cobalt contained in the Co-coated magnetite particles and the Co-coated maghemite particles were respectively measured by using the same measuring apparatus and the same measuring method as described above.

The amount of Si of an oxide of silicon or a hydroxide of silicon coated or existing on the surface of each non-magnetic particle, the amount of Si of silicon oxide fine particles, silicon nitride fine particles, silicon carbide fine particles, silicon sulfide fine particles, and the amount of Si of a silicon compound derived from tetraalkoxysilane, are expressed by a value obtained by subtracting the amount of Si measured before each treatment from that measured after the treatment. The amount of Al of a hydroxide of aluminum or an oxide of aluminum coated or existing on the surface of each non-magnetic particle and the amount of Al of aluminum oxide fine particles, aluminum nitride fine particles, aluminum carbide fine particles, aluminum sulfide fine particles, are expressed by a value obtained by the same method as used in the above measurement of Si.

(6) The desorption percentage (%) of inorganic fine particles adhered onto the non-magnetic composite particles is expressed by a value measured using the following method. The closer to zero the desorption percentage, the smaller the amount of the inorganic fine particles desorbed or fallen-off from the surface of each non-magnetic composite particle.

3 g of the non-magnetic composite particles and 40 ml of ethanol were placed in a 50 ml-precipitation pipe, and then subjected to ultrasonic dispersion for 20 minutes. Thereafter, the obtained dispersion was allowed to stand for 120 minutes, and the inorganic fine particles desorbed were separated from the non-magnetic composite particles by the difference in precipitation speed between both the particles. Next, the non-magnetic composite particles separated from the inorganic fine particles desorbed were mixed again with 40 ml of ethanol, and the obtained mixture was subjected to ultrasonic dispersion for 20 minutes. Then, the obtained dispersion was allowed to stand for 120 minutes, thereby separating the non-magnetic composite particles and the desorbed fined particles from each other. After the thus obtained non-magnetic composite particles were dried at 80° C. for one hour, the contents of Al, Zr, Ce, Ti Si, B and Mo therein were measured by a fluorescent X-ray spectroscopy device "3063M Model" (manufactured by Rigaku Denki Kogyo Co., Ltd.) according to JIS K0119 "General Rule of Fluorescent X-ray Analysis". The desorption percentage of the inorganic fine particles is calculated according to the following formula:

$$\text{Desorption percentage of inorganic fine particles (\%)} = \{(Wa-We)/Wa\} \times 100$$

wherein Wa represents an amount of the inorganic fine particles initially adhered onto the non-magnetic composite particles; and We represents an amount of the inorganic fine particles still adhered on the non-magnetic composite particles after the desorption test.

(7) The volume resistivity of the non-magnetic particles and the non-magnetic composite particles was measured by the following method.

That is, first, 0.5 g of a sample particles to be measured was weighted, and press-molded at 140 Kg/cm$^2$ (1.37×10$^7$ Pa) using a KBr tablet machine (manufactured by Simazu Seisakusho Co., Ltd.), thereby forming a cylindrical test piece.

Next, the thus obtained cylindrical test piece was exposed to an atmosphere maintained at a temperature of 25° C. and a relative humidity of 60% for 12 hours. Thereafter, the cylindrical test piece was set between stainless steel electrodes, and a voltage of 15V was-applied between the electrodes using a Wheatstone bridge (model 4329A, manufactured by Yokogawa-Hokushin Denki Co., Ltd.) to measure a resistance value R ($\Omega$).

The cylindrical test piece was measured with respect to an upper surface area A (cm$^2$) and a thickness $t_0$ (cm) thereof. The measured values were inserted into the following formula, thereby obtaining a volume resistivity X ($\Omega$·cm).

$$X\ (\Omega\cdot cm) = R \times (A/t_0)$$

(8) The surface resistivity of the coating film of the non-magnetic undercoat layer and magnetic recording layer was measured by the following method. That is, the coating film to be measured was exposed to the environment maintained at a temperature of 25° C. and a relative humidity of 60%, for not less than 12 hours. Thereafter, the coating film was slit into 6 mm width, and the slit coating film was placed on two metal electrodes having a width of 6.5 mm such that a coating surface thereof was contacted with the electrodes. 170-gram weights were respectively suspended at opposite ends of the coating film so as to bring the coating film into close contact with the electrodes. D.C. 500 V was applied between the electrodes, thereby measuring the surface resistivity of the coating film.

(9) The magnetic properties of magnetic particles were measured using a vibration sample magnetometer "VSM-3S-15" (manufactured by Toei Kogyo Co., Ltd.) by applying an external magnetic field of 10 kOe (795.8 kA/m) (or 5 kOe (397.9 kA/m) in the case of Co-coated magnetic iron oxide particles). Also, the magnetic properties of magnetic recording medium were measured using the same apparatus by applying an external magnetic field of 10 kOe (795.8 kA/m) (or 5 kOe (397.9 kA/m) in the case where Co-coated magnetic iron oxide particles were used as magnetic particles).

(10) The viscosity of a coating composition was measured at 25° C. by E-type viscometer "EMD-R" (manufactured by Tokyo Keiki Co., Ltd.), and expressed by the value at a shear rate (D) of 1.92 sec$^{-1}$.

(11) The gloss of a coating film was measured by irradiating light thereon at an incident angle of 45° using a gloss meter "UGV-5D" (manufactured by Suga Testing Machine Manufacturing Co., Ltd.), and expressed by the percentage (%) based on a reference plate assuming that the gloss of the reference plate measured under the same conditions is 86.3%.

(12) The surface roughness Ra of a coating film is expressed by a center line average roughness value thereof measured by "Surfcom-575A" (manufactured by Tokyo Seimitsu Co., Ltd.).

(13) The running durability of a magnetic recording medium is expressed by an actual operating time measured under a load of 200 gw (1.96 N) at a relative speed between head and tape of 16 m/s by a Media Durability Tester "MDT-3000" (manufactured by Steinberg Associates Corp.). The longer the actual operating time, the more excellent the running durability.

(14) The magnetic head cleaning property of a magnetic recording medium was determined by visually observing the degree of contamination on the magnetic head after the magnetic tape was run under a load of 200 gw (1.96 N) at a relative speed between head and tape of 16 m/s for 30 minutes. The results of the observation was classified into the following four ranks. The less the contamination on the magnetic head, the higher the magnetic head cleaning property.

A: No contamination on head;

B: Slight contamination on head;

C: Some contamination on head; and

D: Considerable contamination on head.

(15) The strength of a coating film was determined by measuring the Young's modulus thereof using "Autograph" (manufactured by Shimadzu Seisakusho Co., Ltd.). The Young's modulus is expressed by a relative value based on that of a commercially available video tape "AV T-120" (produced by Victor Company of Japan, Limited). The larger the relative value, the higher the strength of the coating film.

(16) The thickness of each of the base film, the non-magnetic undercoat layer and the magnetic recording layer constituting the magnetic recording medium was measured in the following manner by using "Digital Electronic Micrometer R351C" (manufactured by ANRITSU CORP.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1

<Production of Non-Magnetic Composite Particles>

11.0 kg of acicular hematite particles (average major axial diameter: 0.133 $\mu$m; average minor axial diameter: 0.0191 $\mu$m; aspect ratio: 7.0:1; geometrical standard deviation: 1.35; BET specific surface area: 56.2 m$^2$/g; volume resistivity value: 2.1×10$^8$ $\Omega$·cm) were charged into an edge runner "MPUV-2 Model" (manufactured by Matsumoto Chuzo Tekkosho Co., Ltd.). The particles were mixed and stirred at a linear load of 20 Kg/cm (196 N/cm) for 20 minutes to lightly deaggregate the particles.

Then, 1,100 g of a ceria sol containing cerium oxide fine particles having an average particle size of 0.01 $\mu$m (CeO$_2$ content: 20% by weight; produced by Nissan Kagaku Kogyo Co., Ltd.) was added to the deaggregated acicular hematite particles while operating the edge runner, and the resultant mixture was continuously mixed and stirred at a linear load of 40 Kg/cm (392 N/cm) and a stirring speed of 22 rpm for 20 minutes to adhere the cerium oxide fine particles onto the surface of each acicular hematite particle, and thereafter was dried. As a result of fluorescent X-ray analysis of the thus obtained acicular hematite particles, it was confirmed that the content of the cerium oxide fine particles was 1.92% by weight (calculated as $CeO_2$) based on the total weight of the acicular hematite particles and the cerium oxide fine particles adhered thereon.

Further, as a result of the observation by an electron microscope, it was confirmed that no cerium oxide fine particles were present in an isolated state. This indicates that a substantially whole amount of the cerium oxide fine particles added were adhered on the surface of each acicular hematite particle.

Next, 110 g of tetraethoxysilane "KBE 04" (tradename, produced by Shin-Etsu Kagaku Co., Ltd.) was added to the obtained particles for 10 minutes while operating the edge runner, and the resultant mixture was mixed and stirred therein at a linear load of 40 Kg/cm (392 N/cm) and a stirring speed of 22 rpm for 20 minutes, thereby adhering tetraethoxysilane on the surface of each acicular hematite particle on which the cerium oxide fine particles were adhered.

The thus obtained acicular hematite particles were heat-treated at 120° C. for 12 hours, thereby fixing or anchoring the cerium oxide fine particles onto the surface of each acicular hematite particle through a silicon compound produced from tetraethoxysilane, and simultaneously volatilizing residual ethanol and water etc. produced by hydrolysis of tetraethoxysilane or the like. As a result of observation of the thus obtained acicular hematite composite particles by an electron microscope, it was confirmed that no cerium oxide fine particles remained isolated after the fixing or anchoring treatment with the silicon compound produced from tetraethoxysilane. This indicates that a substantially whole amount of the cerium oxide fine particles added were fixed or anchored on the surface of each acicular hematite particle.

The obtained acicular hematite composite particles had an average major axial diameter of 0.133 μm, an average minor axial diameter of 0.0192 μm, an aspect ratio of 6.9:1, a geometrical standard deviation of major axial diameter of 1.35, a BET specific surface area of 58.2 $m^2$/g, a volume resistivity value: $9.1 \times 10^8$ Ω·cm, desorption percentage of inorganic fine particles of 6.5%. As a result of fluorescent X-ray analysis of the obtained particles, it was confirmed that the amount of the silicon compound produced from tetraethoxysilane was 0.130% by weight (calculated as Si) based on the weight of the acicular hematite composite particles.

Example 2
<Production of Non-Magnetic Substrate: Formation of Non-Magnetic Undercoat Layer on Non-Magnetic Base Film>

12 g of the acicular hematite composite particles obtained in Example 1 were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the obtained mixture was mixed and dispersed by a paint shaker for 6 hours to obtain a non-magnetic coating composition.

The thus-obtained non-magnetic coating composition containing the acicular hematite composite particles was as follows:

| | |
|---|---|
| Acicular hematite composite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The viscosity of the obtained non-magnetic coating composition was 384 cP.

The non-magnetic coating composition obtained was applied to a polyethylene terephthalate film of 12 μm thick to a thickness of 55 μm by an applicator, and the coating film was then dried, thereby forming a non-magnetic undercoat layer. The thickness of the non-magnetic undercoat layer was 3.5 μm.

The thus obtained non-magnetic undercoat layer had a gloss of 196%, and a surface roughness Ra of 6.2 nm. The Young's modulus (relative value) thereof was 130. The surface resistivity thereof was $3.5 \times 10^{10}$ Ω/$cm^2$.

Example 3
<Production of a Magnetic Recording Layer>

12 g of magnetic acicular metal particles containing iron as a main component (average major axial diameter: 0.115 μm, average minor axial diameter: 0.0182 μm, aspect ratio: 6.3:1, coercive force: 1910 Oe (152.0 kA/m), saturation magnetization: 131 emu/g (131 $Am^2$/kg)), 0.6 g of a polishing agent (AKP-50: trade name, produced by Sumitomo Chemical Co., Ltd.), 0.36 g of carbon black (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-50) | 5.0 parts by weight |
| Carbon black (#3250B) | 3.0 parts by weight |
| Lubricant (myristic acid:butyl stearate = 1:2) | 3.0 parts by weight |

| -continued | |
|---|---|
| Hardening agent (polyisocyanate) | 5.0 parts by weight |
| Cyclohexanone | 63.5 parts by weight |
| Methyl ethyl ketone | 158.7 parts by weight |
| Toluene | 95.2 parts by weight |

The viscosity of the obtained magnetic coating composition was 5120 cP.

The magnetic coating composition obtained was applied to the non-magnetic undercoat layer obtained in Example 2 to a thickness of 15 µm by an applicator, and the magnetic recording coating film obtained was oriented and dried in a magnetic field, and then calendered. The magnetic recording coating film was then subjected to a curing reaction at 60° C. for 24 hours, and thereafter slit into a width of 0.5 inch (1.27 cm), thereby obtaining a magnetic tape. The thickness of the magnetic recording layer was 1.0 µm.

The coercive force of the magnetic tape produced by forming a magnetic tape was 1969 Oe (156.7 kA/m), the squareness (Br/Bm) thereof was 0.88, the gloss thereof was 219%, the surface roughness Ra thereof was 6.4 nm, the Young's modulus (relative value) thereof was 133, the surface resistivity was $4.7 \times 10^9$ $\Omega/cm^2$, the running durability thereof was 28.9 minutes, and the magnetic head cleaning property thereof was A.

Core Particles 1 to 3

As core particles, non-magnetic particles having properties as shown in Table 1 were prepared.

Core Particles 4

<Forming Undercoat on the Surface of Non-Magnetic Particles>

20 kg of acicular hematite particles (Core particles 1) were added to the water, deaggregated by a stirrer, and then passed through a Homomic-Line Mill (manufactured by Tokushu Kika Kogyo Co., Ltd.) three times, thereby obtaining a slurry of the acicular hematite particles.

The pH value of the obtained slurry was adjusted to 10.5 by using sodium hydroxide solution. Thereafter, the resultant slurry was mixed with water so as to adjust the concentration thereof to 98 g/liter. 150 liters of the diluted slurry was heated to 60° C. while stirring.

5,444 milliliters of a 1.0-mol/liter sodium aluminate aqueous solution (corresponding to 1.0% by weight (calculated as Al) based on the weight of the acicular hematite particles) were added to the slurry. The slurry was allowed to stand for 30 minutes and then mixed with acetic acid so as to adjust the pH value thereof to 7.5.

After being kept under the above condition for 30 minutes, the resultant slurry was filtered, washed with water, dried, and then pulverized, thereby obtaining the acicular hematite particles which were surface-coated with a hydroxide of aluminum.

Main production conditions are shown in Table 2, and various properties of the obtained acicular hematite particles are shown in Table 3.

Core Particles 5 and 6

The same production procedure of the Core particles 4 as defined above was conducted except that kind of core particles and kind and amount of additives added were varied, thereby obtaining Core particles 5 and 6.

Main production conditions are shown in Table 2, and various properties of the obtained Core particles are shown in Table 3. In "kind of coating material" of Table 2, 'A' and 'S' represent a hydroxide of aluminum and an oxide of silicon, respectively.

Inorganic Fine Particles

Inorganic fine particles having properties as shown in Table 4 were prepared.

Examples 4 to 21 and Comparative Examples 1 to 5 and 7 to 9

The same procedure as defined in Example 1 was conducted except that kind of core particles, kind and amount of inorganic fine particles, linear load and time of edge runner treatment used in the fine particle-adhering step, kind and amount of tetraalkoxysilane, and linear load and time of edge runner treatment used in the tetraalkoxysilane-coating step were changed variously, thereby obtaining non-magnetic composite particles.

Main production conditions are shown in Tables 5 to 6, and various properties of the obtained non-magnetic composite particles are shown in Tables 7 to 8.

Comparative Example 6 (Follow-Up Test of Japanese Patent Application Laid-Open (KOKAI) No. 7-192248(1995)):

6.0 kg of the acicular hematite particles as Core particles 1 was mixed and stirred in water, and then 1,000 ml of a 0.1-mol/liter sodium hydroxide aqueous solution was added to the resultant mixture, thereby obtaining a suspension having a pH value of 11.4.

After intimately mixing and stirring the obtained suspension, 2,200 ml of a 0.5-mol/liter sodium aluminate aqueous solution (corresponding to 0.5% by weight (calculated as Al) based on the weight of the acicular hematite particles) was added thereto, and the resultant mixture was further mixed and stirred.

Then, the obtained suspension was mixed with a 0.1-mol/liter HCl aqueous solution while stirring so as to adjust the pH value thereof to 7.0. Immediately after the mixing was continued for 8 minutes, the obtained slurry was filtered, washed with water and then dried by an ordinary method, thereby obtaining acicular hematite particles.

5 kg of the thus obtained acicular hematite particles were charged into an edge runner "MPUV-2 Model" (manufactured by Matsumoto Chuzo Tekkosho Co., Ltd.), and compacted and pulverized at a linear load of 60 Kg/cm (588 N/cm) for 60 minutes.

Various properties of the obtained acicular hematite particles are shown in Table 6.

Examples 22 to 39 and Comparative Examples 10 to 21

<Production of Non-Magnetic Substrate: Formation of Non-Magnetic Undercoat Layer on Non-Magnetic Base Film>

Non-magnetic undercoat layers were produced in the same way as in Example 2 except for varying the kind of the non-magnetic acicular composite particles.

The main producing conditions and various properties are shown in Tables 9 to 10.

Examples 40 to 61 and Comparative Examples 22 to 33

<Production of Magnetic Recording Medium: Formation of Magnetic Coating Film>

Magnetic recording media were produced in the same way as in Example 3 except for varying the kind of non-magnetic undercoat layer, the kind of magnetic particles and the amount of the polishing agent.

Various properties of the magnetic particles (1) to (4) used, are shown in Table 11.

The main producing conditions shown in Tables 12 to 13 and various properties are shown in Tables 14 to 16.

TABLE 1

| Core particles | Properties of acicular hematite particles or accicular goethite particles | |
|---|---|---|
| | Kind | Particle shape |
| Core particles 1 | Hematite particles | Acicular |
| Core particles 2 | Hematite particles | Spindle-shaped |
| Core particles 3 | Goethite particles | Acicular |

| Core particles | Properties of acicular hematite particles or acicular goethite particles | | |
|---|---|---|---|
| | Average major axial diameter ($\mu$m) | Average major axial diameter ($\mu$m) | Aspect ratio (-) |
| Core particles 1 | 0.143 | 0.0210 | 6.8:1 |
| Core particles 2 | 0.187 | 0.0240 | 7.8:1 |
| Core particles 3 | 0.240 | 0.0272 | 8.8:1 |

| Core particles | Properties of acicular hematite particles or acicular goethite particles | | |
|---|---|---|---|
| | Geometrical standard deviation value (-) | BET specific surface area ($m^2$/g) | Volume resistivity value ($\Omega \cdot$ cm) |
| Core particles 1 | 1.38 | 55.3 | $2.3 \times 10^8$ |
| Core particles 2 | 1.33 | 43.3 | $8.6 \times 10^8$ |
| Core particles 3 | 1.37 | 86.3 | $9.6 \times 10^7$ |

TABLE 2

| Core particles | Kind of core particles | Surface-treatment step Additive | | |
|---|---|---|---|---|
| | | Kind | Calculated as | Amount (wt. %) |
| Core particles 4 | Core particles 1 | Sodium aluminate | Al | 1.0 |
| Core particles 5 | Core particles 2 | Water glass #3 | SiO$_2$ | 0.5 |
| Core particles 6 | Core particles 3 | Sodium aluminate | Al | 1.0 |
| | | Colloidal silica | SiO$_2$ | 3.0 |

| Core particles | Surface-treatment step Coating material | | |
|---|---|---|---|
| | Kind | Calculated as | Amount (wt. %) |
| Core particles 4 | A | Al | 0.98 |
| Core particles 5 | S | SiO$_2$ | 0.48 |
| Core particles 6 | A | Al | 0.96 |
| | S | SiO$_2$ | 2.81 |

TABLE 3

| Core particles | Properties of surface-treated core particles | | |
|---|---|---|---|
| | Average major axial diameter ($\mu$m) | Average minor axial diameter ($\mu$m) | Aspect ratio (-) |
| Core particles 4 | 0.143 | 0.0210 | 6.8:1 |
| Core particles 5 | 0.187 | 0.0241 | 7.8:1 |
| Core particles 6 | 0.241 | 0.0272 | 8.9:1 |

| Core particles | Properties of surface-treated core particles | | |
|---|---|---|---|
| | Geometrical standard deviation value (-) | BET specific surface area ($m^2$/g) | Volume resistivity value ($\Omega \cdot$ cm) |
| Core particles 4 | 1.37 | 54.9 | $4.6 \times 10^8$ |
| Core particles 5 | 1.33 | 43.6 | $9.1 \times 10^8$ |
| Core particles 6 | 1.36 | 85.8 | $9.3 \times 10^7$ |

TABLE 4

| Fine particles | Kind of fine particles | |
|---|---|---|
| Fine particles 1 | Oxide | Alumina sol (Al$_2$O$_3$ concentration: 20%; produced by Nissan Kagaku Kogyo Co., Ltd.) |
| Fine particles 2 | Oxide | STS-01 (TiO$_2$ concentration: 30%; produced by Ishihara Sangyo Co., Ltd.) |
| Fine particles 3 | Oxide | NZS-30A (ZrO$_2$ concentration: 30%; produced by Nissan Kagaku Kogyo Co., Ltd.) |
| Fine particles 4 | Oxide | Ceria sol (CeO$_2$ concentration: 20%; produced by Nissan Kagaku Kogyo Co., Ltd.) |
| Fine particles 5 | Oxide | SNOWTEX-XS (SiO$_2$ concentration: 20%; produced by Nissan Kagaku Kogyo Co., Ltd.) |
| Fine particles 6 | Nitride | Aluminum nitride (AlN concentration: 20%) |
| Fine particles 7 | Carbide | Silicon carbide (SiC concentration: 20%) |
| Fine particles 8 | Sulfide | Molybdenum disulfide (MoS$_2$ concentration: 20%) |

| Fine particles | Properties of inorganic fine particles | | |
|---|---|---|---|
| | Particle shape | Average particle size ($\mu$m) | Geometrical standard deviation value (-) |
| Fine particles 1 | Granular | 0.012 | 2.56 |
| Fine particles 2 | Granular | 0.007 | 1.56 |
| Fine particles 3 | Granular | 0.070 | 1.63 |
| Fine particles 4 | Granular | 0.010 | 1.46 |
| Fine particles 5 | Granular | 0.005 | 1.46 |
| Fine particles 6 | Granular | 0.024 | 1.68 |

TABLE 4-continued

| | | | |
|---|---|---|---|
| Fine particles 7 | Granular | 0.018 | 1.53 |
| Fine particles 8 | Granular | 0.038 | 1.71 |

TABLE 5

| Examples and Comparative Examples | Kind of core particles | Production of non-magnetic composite particles Adhesion with fine particles Colloid solution | |
|---|---|---|---|
| | | Kind | Amount added (part by weight) |
| Example 4 | Core particles 1 | Fine particles 1 | 10.0 |
| Example 5 | Core particles 1 | Fine particles 2 | 2.5 |
| Example 6 | Core particles 1 | Fine particles 3 | 2.0 |
| Example 7 | Core particles 1 | Fine particles 4 | 10.0 |
| Example 8 | Core particles 2 | Fine particles 1 | 3.0 |
| Example 9 | Core particles 2 | Fine particles 3 | 15.0 |
| Example 10 | Core particles 3 | Fine particles 5 | 10.0 |
| Example 11 | Core particles 4 | Fine particles 4 | 2.0 |
| Example 12 | Core particles 5 | Fine particles 1 | 5.0 |
| | | Fine particles 3 | 1.0 |
| Example 13 | Core particles 6 | Fine particles 1 | 3.0 |
| | | Fine particles 4 | 1.5 |
| Comparative Example 1 | Core particles 1 | — | — |
| Comparative Example 2 | Core particles 1 | Fine particles 1 | 5.0 |
| Comparative Example 3 | Core particles 1 | Fine particles 1 | 5.0 |
| Comparative Example 4 | Core particles 1 | Fine particles 1 | 0.005 |
| Comparative Example 5 | Core particles 1 | Fine particles 5 | 5.0 |

| Examples and Comparative Examples | Production of non-magnetic composite particles Adhesion with fine particles | | | |
|---|---|---|---|---|
| | Edge runner treatment | | Amount adhered | |
| | Linear load (N/cm) | Linear load (Kg/cm) | Time (min.) | Calculated as |  Amount (wt. %) |

| Examples | Linear load (N/cm) | (Kg/cm) | Time (min.) | Calculated as | Amount (wt. %) |
|---|---|---|---|---|---|
| Example 4 | 392 | 40 | 20 | $Al_2O_3$ | 1.90 |
| Example 5 | 588 | 60 | 30 | $TiO_2$ | 0.70 |
| Example 6 | 294 | 30 | 30 | $ZrO_2$ | 0.52 |
| Example 7 | 588 | 60 | 20 | $CeO_2$ | 1.91 |
| Example 8 | 392 | 40 | 20 | $Al_2O_3$ | 0.51 |
| Example 9 | 294 | 30 | 60 | $ZrO_2$ | 4.26 |
| Example 10 | 588 | 60 | 20 | $SiO_2$ | 1.92 |
| Example 11 | 441 | 45 | 20 | $CeO_2$ | 0.38 |
| Example 12 | 392 | 40 | 30 | $Al_2O_3$ | 0.98 |
| | | | | $ZrO_2$ | 0.25 |
| Example 13 | 392 | 40 | 30 | $Al_2O_3$ | 0.58 |
| | | | | $CeO_2$ | 0.25 |
| Comparative Example 1 | — | — | — | — | — |
| Comparative Example 2 | 392 | 40 | 20 | $Al_2O_3$ | 0.96 |
| Comparative Example 3 | 392 | 40 | 20 | $Al_2O_3$ | 0.95 |
| Comparative Example 4 | 392 | 40 | 20 | $Al_2O_3$ | $9 \times 10^{-4}$ |
| Comparative Example 5 | 392 | 40 | 20 | $SiO_2$ | 0.95 |

| Examples and Comparative Examples | Production of non-magnetic composite particles Coating with tetraalkoxysilane Tetraalkoxysilane | |
|---|---|---|
| | Kind | Amount added (part by weight) |
| Example 4 | Tetraethoxysilane | 1.0 |
| Example 5 | Tetraethoxysilane | 0.5 |
| Example 6 | Tetraethoxysilane | 2.0 |
| Example 7 | Tetraethoxysilane | 1.0 |
| Example 8 | Tetraethoxysilane | 3.0 |
| Example 9 | Tetraethoxysilane | 5.0 |
| Example 10 | Tetraethoxysilane | 2.0 |
| Example 11 | Tetraethoxysilane | 0.3 |
| Example 12 | Tetraethoxysilane | 1.0 |
| Example 13 | Tetraethoxysilane | 1.5 |
| Comparative Example 1 | Tetraethoxysilane | 2.0 |
| Comparative Example 2 | — | — |
| Comparative Example 3 | Tetraethoxysilane | 0.005 |
| Comparative Example 4 | Tetraethoxysilane | 1.0 |
| Comparative Example 5 | Methyl hydrogenpolysiloxane | 1.0 |

| Examples and Comparative Examples | Production of non-magnetic composite particles Coating with tetraalkoxysilane | | | |
|---|---|---|---|---|
| | Edge runner treatment | | | Coating amount (calculated as Si) |
| | Linear load (N/cm) | (Kg/cm) | Time (min.) | (wt. %) |
| Example 4 | 294 | 30 | 20 | 0.132 |
| Example 5 | 392 | 40 | 20 | 0.065 |
| Example 6 | 294 | 30 | 20 | 0.361 |
| Example 7 | 392 | 40 | 30 | 0.131 |
| Example 8 | 392 | 40 | 30 | 0.391 |
| Example 9 | 588 | 60 | 20 | 0.640 |
| Example 10 | 441 | 45 | 30 | 0.261 |
| Example 11 | 294 | 30 | 20 | 0.039 |
| Example 12 | 392 | 40 | 30 | 0.132 |
| Example 13 | 392 | 40 | 20 | 0.190 |
| Comparative Example 1 | 294 | 30 | 30 | 0.258 |
| Comparative Example 2 | — | — | — | — |
| Comparative Example 3 | 294 | 30 | 30 | $6 \times 10^{-4}$ |
| Comparative Example 4 | 294 | 30 | 30 | 0.130 |
| Comparative Example 5 | 294 | 30 | 30 | 0.428 |

| Examples and Comparative Examples | Production of non-magnetic composite particles Heat-treatment step | |
|---|---|---|
| | Heating temperature (° C.) | Heating time (hour) |
| Example 4 | 60 | 24 |
| Example 5 | 100 | 6 |
| Example 6 | 80 | 12 |
| Example 7 | 120 | 1 |
| Example 8 | 100 | 2 |
| Example 9 | 80 | 4 |

TABLE 5-continued

| | | |
|---|---|---|
| Example 10 | 80 | 6 |
| Example 11 | 120 | 12 |
| Example 12 | 105 | 6 |
| Example 13 | 80 | 3 |
| Comparative Example 1 | 80 | 12 |
| Comparative Example 2 | 80 | 12 |
| Comparative Example 3 | 80 | 12 |
| Comparative Example 4 | 80 | 12 |
| Comparative Example 5 | 80 | 12 |

TABLE 6

| | Production of non-magnetic composite particles Adhesion with fine particles | | |
|---|---|---|---|
| | | Colloid solution | |
| Examples and Comparative Examples | Kind of core particles | Kind | Amount added (part by weight) |
| Example 14 | Core particles 1 | Fine particles 6 | 2.0 |
| Example 15 | Core particles 1 | Fine particles 7 | 5.0 |
| Example 16 | Core particles 1 | Fine particles 8 | 1.0 |
| Example 17 | Core particles 2 | Fine particles 6 | 2.0 |
| Example 18 | Core particles 3 | Fine particles 7 | 4.0 |
| Example 19 | Core particles 4 | Fine particles 7 | 3.0 |
| Example 20 | Core particles 5 | Fine particles 6 | 2.0 |
| Example 21 | Core particles 6 | Fine particles 8 | 1.0 |
| Comparative Example 7 | Core particles 1 | Fine particles 7 | 5.0 |
| Comparative Example 8 | Core particles 1 | Fine particles 7 | 5.0 |
| Comparative Example 9 | Core particles 1 | Fine particles 7 | 0.005 |

| | Production of non-magnetic composite particles Adhesion with fine particles | | | |
|---|---|---|---|---|
| Examples and Comparative Examples | Edge runner treatment | | Amount adhered | |
| | Linear load | Time | Calculated as | Amount |
| | (N/cm) (Kg/cm) | (min.) | | (wt. %) |
| Example 14 | 588 60 | 20 | AlN | 0.39 |
| Example 15 | 294 30 | 30 | SiC | 0.95 |
| Example 16 | 441 45 | 20 | MoS$_2$ | 0.19 |
| Example 17 | 294 30 | 20 | AlN | 0.40 |
| Example 18 | 588 60 | 30 | SiC | 0.76 |
| Example 19 | 294 30 | 30 | SiC | 0.54 |
| Example 20 | 196 20 | 30 | AlN | 0.40 |
| Example 21 | 294 30 | 20 | MoS$_2$ | 0.20 |
| Comparative Example 7 | 294 30 | 20 | SiC | 0.95 |
| Comparative Example 8 | 294 30 | 20 | SiC | 0.96 |
| Comparative Example 9 | 294 30 | 20 | SiC | 9 × 10$^{-4}$ |

TABLE 6-continued

| | Production of non-magnetic composite particles Coating with tetraalkoxysilane | |
|---|---|---|
| Examples and Comparative Examples | Tetraalkoxysilane | |
| | Kind | Amount added (part by weight) |
| Example 14 | Tetraethoxysilane | 1.0 |
| Example 15 | Tetraethoxysilane | 0.5 |
| Example 16 | Tetramethoxysilane | 2.0 |
| Example 17 | Tetraethoxysilane | 1.0 |
| Example 18 | Tetraethoxysilane | 3.0 |
| Example 19 | Tetraethoxysilane | 5.0 |
| Example 20 | Tetraethoxysilane | 2.0 |
| Example 21 | Tetraethoxysilane | 2.0 |
| Comparative Example 7 | — | — |
| Comparative Example 8 | Tetraethoxysilane | 0.005 |
| Comparative Example 9 | Tetraethoxysilane | 1.0 |

| | Production of non-magnetic composite particles Coating with tetraalkoxysilane | | | |
|---|---|---|---|---|
| Examples and Comparative Examples | Edge runner treatment | | | Coating amount (calculated as Si) |
| | Linear load | | Time (min.) | |
| | (N/cm) | (Kg/cm) | | (wt. %) |
| Example 14 | 294 | 30 | 20 | 0.130 |
| Example 15 | 441 | 45 | 20 | 0.065 |
| Example 16 | 294 | 30 | 30 | 0.359 |
| Example 17 | 294 | 30 | 30 | 0.128 |
| Example 18 | 588 | 60 | 20 | 0.395 |
| Example 19 | 441 | 45 | 20 | 0.640 |
| Example 20 | 196 | 20 | 20 | 0.240 |
| Example 21 | 294 | 30 | 30 | 0.239 |
| Comparative Example 7 | — | — | — | — |
| Comparative Example 8 | 294 | 30 | 30 | 6 × 10$^{-4}$ |
| Comparative Example 9 | 294 | 30 | 30 | 0.130 |

| | Production of non-magnetic composite particles Heat-treatment step | |
|---|---|---|
| Examples and Comparative Examples | Heating temperature (° C.) | Heating time (hour) |
| Example 14 | 80 | 12 |
| Example 15 | 80 | 12 |
| Example 16 | 80 | 12 |
| Example 17 | 60 | 12 |
| Example 18 | 100 | 12 |
| Example 19 | 60 | 18 |
| Example 20 | 80 | 6 |
| Example 21 | 80 | 15 |
| Comparative Example 7 | 80 | 12 |
| Comparative Example 8 | 80 | 12 |
| Comparative Example 9 | 80 | 12 |

TABLE 7

Properties of acicular non-magnetic composite particles

| Examples and Comparative Examples | Average major axial diameter (μm) | Average minor axial diameter (μm) | Aspect ratio (-) | Geometrical standard deviation value (-) |
|---|---|---|---|---|
| Example 4 | 0.144 | 0.0211 | 6.8:1 | 1.37 |
| Example 5 | 0.143 | 0.0212 | 6.7:1 | 1.37 |
| Example 6 | 0.144 | 0.0211 | 6.8:1 | 1.37 |
| Example 7 | 0.143 | 0.0212 | 6.7:1 | 1.38 |
| Example 8 | 0.187 | 0.0242 | 7.7:1 | 1.33 |
| Example 9 | 0.188 | 0.0241 | 7.8:1 | 1.34 |
| Example 10 | 0.241 | 0.0273 | 8.8:1 | 1.36 |
| Example 11 | 0.143 | 0.0210 | 6.8:1 | 1.37 |
| Example 12 | 0.187 | 0.0242 | 7.7:1 | 1.33 |
| Example 13 | 0.242 | 0.0272 | 8.9:1 | 1.36 |
| Comparative Example 1 | 0.143 | 0.0210 | 6.8:1 | — |
| Comparative Example 2 | 0.143 | 0.0211 | 6.8:1 | 1.37 |
| Comparative Example 3 | 0.144 | 0.0211 | 6.8:1 | — |
| Comparative Example 4 | 0.143 | 0.0210 | 6.8:1 | — |
| Comparative Example 5 | 0.143 | 0.0212 | 6.7:1 | 1.38 |
| Comparative Example 6 | 0.144 | 0.0212 | 6.8:1 | — |

Properties of acicular non-magnetic composite particles

| Examples and Comparative Examples | BET specific surface area value (m²/g) | Volume resistivity value (Ω·cm) | Desorption percentage of fine particles (%) |
|---|---|---|---|
| Example 4 | 56.3 | $2.6 \times 10^9$ | 8.2 |
| Example 5 | 55.5 | $1.3 \times 10^9$ | 6.8 |
| Example 6 | 55.8 | $1.8 \times 10^9$ | 7.3 |
| Example 7 | 56.1 | $2.4 \times 10^9$ | 7.6 |
| Example 8 | 44.1 | $7.2 \times 10^9$ | 8.6 |
| Example 9 | 45.1 | $6.6 \times 10^9$ | 5.3 |
| Example 10 | 85.4 | $7.4 \times 10^8$ | 6.4 |
| Example 11 | 55.1 | $3.2 \times 10^9$ | 3.1 |
| Example 12 | 43.9 | $6.4 \times 10^9$ | 3.8 |
| Example 13 | 85.9 | $8.9 \times 10^8$ | 1.2 |
| Comparative Example 1 | 54.1 | $3.6 \times 10^9$ | — |
| Comparative Example 2 | 58.2 | $1.2 \times 10^9$ | 56.9 |
| Comparative Example 3 | 58.0 | $2.3 \times 10^9$ | 35.6 |
| Comparative Example 4 | 55.0 | $2.6 \times 10^9$ | — |
| Comparative Example 5 | 50.1 | $6.7 \times 10^{12}$ | 8.6 |
| Comparative Example 6 | 56.7 | $3.6 \times 10^9$ | 18.3 |

TABLE 8

Properties of acicular non-magnetic composite particles

| Examples and Comparative Examples | Average major axial diameter (μm) | Average minor axial diameter (μm) | Aspect ratio (-) | Geometrical standard deviation value (-) |
|---|---|---|---|---|
| Example 14 | 0.143 | 0.0211 | 6.8:1 | 1.38 |
| Example 15 | 0.144 | 0.0212 | 6.8:1 | 1.38 |
| Example 16 | 0.143 | 0.0211 | 6.8:1 | 1.38 |
| Example 17 | 0.187 | 0.0241 | 7.8:1 | 1.33 |
| Example 18 | 0.241 | 0.0275 | 8.8:1 | 1.37 |
| Example 19 | 0.143 | 0.0211 | 6.8:1 | 1.38 |
| Example 20 | 0.187 | 0.0242 | 7.7:1 | 1.33 |
| Example 21 | 0.241 | 0.0273 | 8.8:1 | 1.37 |
| Comparative Example 7 | 0.143 | 0.0210 | 6.8:1 | 1.38 |
| Comparative Example 8 | 0.143 | 0.0210 | 6.8:1 | — |
| Comparative Example 9 | 0.143 | 0.0210 | 6.8:1 | — |

Properties of acicular non-magnetic composite particles

| Examples and Comparative Examples | BET specific surface area value (m²/g) | Volume resistivity value (Ω·cm) | Desorption percentage of fine particles (%) |
|---|---|---|---|
| Example 14 | 56.4 | $2.4 \times 10^9$ | 6.4 |
| Example 15 | 57.2 | $3.8 \times 10^9$ | 8.2 |
| Example 16 | 55.8 | $1.8 \times 10^9$ | 6.1 |
| Example 17 | 45.6 | $3.4 \times 10^9$ | 7.3 |
| Example 18 | 86.6 | $5.6 \times 10^8$ | 7.6 |
| Example 19 | 56.1 | $2.3 \times 10^9$ | 4.3 |
| Example 20 | 45.0 | $2.8 \times 10^9$ | 2.1 |
| Example 21 | 86.2 | $5.4 \times 10^8$ | 1.6 |
| Comparative Example 7 | 60.4 | $2.8 \times 10^9$ | 54.2 |
| Comparative Example 8 | 58.3 | $1.9 \times 10^9$ | 36.6 |
| Comparative Example 9 | 54.9 | $3.8 \times 10^9$ | — |

TABLE 9

| Examples | Production of non-magnetic coating composition | | Properties of non-magnetic coating composition Viscosity (cP) |
|---|---|---|---|
| | Kind of non-magnetic particles | Weight ratio of particles to resin (-) | |
| Example 22 | Example 4 | 5.0:1 | 410 |
| Example 23 | Example 5 | 5.0:1 | 384 |
| Example 24 | Example 6 | 5.0:1 | 333 |
| Example 25 | Example 7 | 5.0:1 | 358 |
| Example 26 | Example 8 | 5.0:1 | 410 |
| Example 27 | Example 9 | 5.0:1 | 435 |
| Example 28 | Example 10 | 5.0:1 | 486 |
| Example 29 | Example 11 | 5.0:1 | 410 |
| Example 30 | Example 12 | 5.0:1 | 358 |
| Example 31 | Example 13 | 5.0:1 | 384 |
| Example 32 | Example 14 | 5.0:1 | 307 |
| Example 33 | Example 15 | 5.0:1 | 389 |
| Example 34 | Example 16 | 5.0:1 | 415 |
| Example 35 | Example 17 | 5.0:1 | 461 |
| Example 36 | Example 18 | 5.0:1 | 363 |
| Example 37 | Example 19 | 5.0:1 | 512 |
| Example 38 | Example 20 | 5.0:1 | 336 |
| Example 39 | Example 21 | 5.0:1 | 312 |

Properties of non-magnetic undercoat layer

| Examples | Thickness of non-magnetic undercoat layer (μm) | Gloss (%) | Surface roughness Ra (nm) |
|---|---|---|---|
| Example 22 | 3.5 | 193 | 6.2 |
| Example 23 | 3.5 | 192 | 6.4 |
| Example 24 | 3.5 | 190 | 6.6 |

TABLE 9-continued

| | | | |
|---|---|---|---|
| Example 25 | 3.4 | 195 | 6.8 |
| Example 26 | 3.5 | 192 | 6.4 |
| Example 27 | 3.4 | 196 | 6.4 |
| Example 28 | 3.5 | 184 | 7.6 |
| Example 29 | 3.5 | 206 | 6.0 |
| Example 30 | 3.4 | 198 | 5.8 |
| Example 31 | 3.4 | 188 | 6.8 |
| Example 32 | 3.5 | 193 | 6.4 |
| Example 33 | 3.5 | 198 | 6.2 |
| Example 34 | 3.5 | 191 | 7.0 |
| Example 35 | 3.5 | 192 | 7.0 |
| Example 36 | 3.5 | 185 | 7.5 |
| Example 37 | 3.5 | 200 | 6.0 |
| Example 38 | 3.5 | 196 | 6.3 |
| Example 39 | 3.5 | 188 | 7.1 |

| | Properties of non-magnetic undercoat layer | |
|---|---|---|
| Examples | Young's modulus (relative value) | Surface resistivity value ($\Omega/cm^2$) |
| Example 22 | 131 | $3.2 \times 10^{12}$ |
| Example 23 | 132 | $2.6 \times 10^{12}$ |
| Example 24 | 130 | $9.8 \times 10^{11}$ |
| Example 25 | 131 | $3.6 \times 10^{12}$ |
| Example 26 | 136 | $3.1 \times 10^{12}$ |
| Example 27 | 135 | $4.3 \times 10^{12}$ |
| Example 28 | 138 | $9.3 \times 10^{11}$ |
| Example 29 | 133 | $4.2 \times 10^{12}$ |
| Example 30 | 138 | $4.7 \times 10^{12}$ |
| Example 31 | 141 | $9.6 \times 10^{11}$ |
| Example 32 | 131 | $1.6 \times 10^{12}$ |
| Example 33 | 132 | $3.6 \times 10^{12}$ |
| Example 34 | 131 | $1.4 \times 10^{12}$ |
| Example 35 | 134 | $2.7 \times 10^{12}$ |
| Example 36 | 138 | $8.1 \times 10^{11}$ |
| Example 37 | 134 | $4.9 \times 10^{12}$ |
| Example 38 | 138 | $3.8 \times 10^{12}$ |
| Example 39 | 139 | $8.5 \times 10^{11}$ |

TABLE 10

| | Production of non-magnetic coating composition | | Properties of non-magnetic coating composition |
|---|---|---|---|
| Comparative Examples | Kind of non-magnetic particles | Weight ratio of particles to resin (−) | Viscosity (cP) |
| Comparative Example 10 | Core particles 1 | 5.0:1 | 461 |
| Comparative Example 11 | Core particles 2 | 5.0:1 | 435 |
| Comparative Example 12 | Core particles 3 | 5.0:1 | 358 |
| Comparative Example 13 | Comparative Example 1 | 5.0:1 | 461 |
| Comparative Example 14 | Comparative Example 2 | 5.0:1 | 1,126 |
| Comparative Example 15 | Comparative Example 3 | 5.0:1 | 1,229 |
| Comparative Example 16 | Comparative Example 4 | 5.0:1 | 435 |
| Comparative Example 17 | Comparative Example 5 | 5.0:1 | 384 |
| Comparative Example 18 | Comparative Example 6 | 5.0:1 | 1,638 |
| Comparative Example 19 | Comparative Example 7 | 5.0:1 | 1,101 |
| Comparative Example 20 | Comparative Example 8 | 5.0:1 | 1,408 |
| Comparative Example 21 | Comparative Example 9 | 5.0:1 | 896 |

TABLE 10-continued

| | Properties of non-magnetic undercoat layer | | |
|---|---|---|---|
| Comparative Examples | Thickness of non-magnetic undercoat layer ($\mu$m) | Gloss (%) | Surface roughness Ra (nm) |
| Comparative Example 10 | 3.5 | 176 | 8.6 |
| Comparative Example 11 | 3.5 | 174 | 8.7 |
| Comparative Example 12 | 3.5 | 165 | 10.4 |
| Comparative Example 13 | 3.5 | 166 | 18.6 |
| Comparative Example 14 | 3.6 | 136 | 31.6 |
| Comparative Example 15 | 3.6 | 143 | 27.1 |
| Comparative Example 16 | 3.5 | 164 | 17.2 |
| Comparative Example 17 | 3.5 | 121 | 36.8 |
| Comparative Example 18 | 3.7 | 174 | 10.8 |
| Comparative Example 19 | 3.6 | 138 | 28.3 |
| Comparative Example 20 | 3.6 | 141 | 25.3 |
| Comparative Example 21 | 3.5 | 162 | 17.3 |

| | Properties of non-magnetic undercoat layer | |
|---|---|---|
| Comparative Examples | Young's modulus (relative value) | Surface resistivity value ($\Omega/cm^2$) |
| Comparative Example 10 | 123 | $3.1 \times 10^{12}$ |
| Comparative Example 11 | 124 | $4.1 \times 10^{12}$ |
| Comparative Example 12 | 119 | $8.8 \times 10^{11}$ |
| Comparative Example 13 | 120 | $4.4 \times 10^{12}$ |
| Comparative Example 14 | 111 | $3.1 \times 10^{12}$ |
| Comparative Example 15 | 113 | $3.2 \times 10^{12}$ |
| Comparative Example 16 | 123 | $2.6 \times 10^{12}$ |
| Comparative Example 17 | 103 | $1.9 \times 10^{14}$ |
| Comparative Example 18 | 120 | $2.1 \times 10^{12}$ |
| Comparative Example 19 | 113 | $3.8 \times 10^{12}$ |
| Comparative Example 20 | 116 | $4.5 \times 10^{12}$ |
| Comparative Example 21 | 122 | $2.3 \times 10^{12}$ |

TABLE 11

| Magnetic particles | Kind |
|---|---|
| Magnetic particles (1) | Acicular magnetic metal particles containing iron as a main component |
| Magnetic particles (2) | Acicular magnetic metal particles containing iron as a main component |
| Magnetic particles (3) | Co-coated magnetite particles (Co content: 4.82 wt. %) |
| Magnetic particles (4) | Co-coated maghemite particles (Co content: 4.21 wt. %) |

TABLE 11-continued

Properties of magnetic particles

| Magnetic particles | Average major axial diameter (μm) | Average minor axial diameter (μm) | Aspect ratio (-) | Geometrical standard deviation value (-) |
|---|---|---|---|---|
| Magnetic particles (1) | 0.127 | 0.0177 | 7.2:1 | 1.39 |
| Magnetic particles (2) | 0.105 | 0.0148 | 7.1:1 | 1.36 |
| Magnetic particles (3) | 0.151 | 0.0221 | 6.8:1 | 1.44 |
| Magnetic particles (4) | 0.211 | 0.0285 | 7.4:1 | 1.36 |

Properties of magnetic particles

| Magnetic particles | Coercive force value (kA/m) | (Oe) | Saturation magnetization value (Am²/kg) | (emu/g) |
|---|---|---|---|---|
| Magnetic particles (1) | 152.4 | 1,915 | 135.6 | 135.6 |
| Magnetic particles (2) | 133.7 | 1,680 | 128.3 | 128.3 |
| Magnetic particles (3) | 72.7 | 913 | 81.3 | 81.3 |
| Magnetic particles (4) | 67.2 | 845 | 78.9 | 78.9 |

TABLE 12

Production of magnetic coating composition

| Examples | Kind of non-magnetic undercoat layer | Kind of magnetic particles |
|---|---|---|
| Example 40 | Example 22 | Magnetic particles (1) |
| Example 41 | Example 23 | Magnetic particles (1) |
| Example 42 | Example 24 | Magnetic particles (1) |
| Example 43 | Example 25 | Magnetic particles (1) |
| Example 44 | Example 26 | Magnetic particles (3) |
| Example 45 | Example 27 | Magnetic particles (3) |
| Example 46 | Example 28 | Magnetic particles (2) |
| Example 47 | Example 29 | Magnetic particles (1) |
| Example 48 | Example 30 | Magnetic particles (3) |
| Example 49 | Example 31 | Magnetic particles (4) |
| Example 50 | Example 25 | Magnetic particles (1) |
| Example 51 | Example 27 | Magnetic particles (3) |
| Example 52 | Example 32 | Magnetic particles (1) |
| Example 53 | Example 33 | Magnetic particles (1) |
| Example 54 | Example 34 | Magnetic particles (1) |
| Example 55 | Example 35 | Magnetic particles (2) |
| Example 56 | Example 36 | Magnetic particles (3) |
| Example 57 | Example 37 | Magnetic particles (1) |
| Example 58 | Example 38 | Magnetic particles (3) |
| Example 59 | Example 39 | Magnetic particles (4) |
| Example 60 | Example 32 | Magnetic particles (1) |
| Example 61 | Example 33 | Magnetic particles (3) |

| Examples | Production of magnetic coating composition Weight ratio of particles to resin (–) | Amount of abrasives added (ratio to magnetic particles) (part by weight) | Properties of magnetic coating composition Viscosity (cP) |
|---|---|---|---|
| Example 40 | 5.0:1 | 5.0:1 | 5,632 |
| Example 41 | 5.0:1 | 5.0:1 | 5,427 |
| Example 42 | 5.0:1 | 5.0:1 | 5,606 |
| Example 43 | 5.0:1 | 5.0:1 | 5,350 |
| Example 44 | 5.0:1 | 5.0:1 | 3,072 |
| Example 45 | 5.0:1 | 5.0:1 | 3,174 |
| Example 46 | 5.0:1 | 5.0:1 | 4,557 |
| Example 47 | 5.0:1 | 5.0:1 | 1,070 |
| Example 48 | 5.0:1 | 5.0:1 | 2,944 |
| Example 49 | 5.0:1 | 5.0:1 | 2,688 |
| Example 50 | 5.0:1 | 3.0:1 | 5,120 |
| Example 51 | 5.0:1 | 3.0:1 | 2,304 |
| Example 52 | 5.0:1 | 5.0:1 | 5,120 |
| Example 53 | 5.0:1 | 5.0:1 | 5,248 |
| Example 54 | 5.0:1 | 5.0:1 | 5,453 |
| Example 55 | 5.0:1 | 5.0:1 | 4,613 |
| Example 56 | 5.0:1 | 5.0:1 | 3,202 |
| Example 57 | 5.0:1 | 5.0:1 | 5,322 |
| Example 58 | 5.0:1 | 5.0:1 | 3,148 |
| Example 59 | 5.0:1 | 5.0:1 | 2,867 |
| Example 60 | 5.0:1 | 3.0:1 | 5,427 |
| Example 61 | 5.0:1 | 3.0:1 | 2,841 |

TABLE 13

Production of magnetic coating composition

| Comparative Examples | Kind of non-magnetic undercoat layer | Kind of magnetic particles |
|---|---|---|
| Comparative Example 22 | Comparative Example 10 | Magnetic particles (1) |
| Comparative Example 23 | Comparative Example 11 | Magnetic particles (1) |
| Comparative Example 24 | Comparative Example 12 | Magnetic particles (1) |
| Comparative Example 25 | Comparative Example 13 | Magnetic particles (1) |
| Comparative Example 26 | Comparative Example 14 | Magnetic particles (1) |
| Comparative Example 27 | Comparative Example 15 | Magnetic particles (1) |
| Comparative Example 28 | Comparative Example 16 | Magnetic particles (1) |
| Comparative Example 29 | Comparative Example 17 | Magnetic particles (1) |
| Comparative Example 30 | Comparative Example 18 | Magnetic particles (3) |
| Comparative Example 31 | Comparative Example 19 | Magnetic particles (1) |
| Comparative Example 32 | Comparative Example 20 | Magnetic particles (1) |
| Comparative Example 33 | Comparative Example 21 | Magnetic particles (1) |

| Comparative Examples | Production of magnetic coating composition Weight ratio of particles to resin (–) | Amount of abrasives added (ratio to magnetic particles) (part by weight) | Properties of magnetic coating composition Viscosity (cP) |
|---|---|---|---|
| Comparative Example 22 | 5.0:1 | 5.0:1 | 6,552 |
| Comparative Example 23 | 5.0:1 | 5.0:1 | 7,168 |
| Comparative Example 24 | 5.0:1 | 5.0:1 | 7,560 |
| Comparative Example 25 | 5.0:1 | 5.0:1 | 6,359 |
| Comparative Example 26 | 5.0:1 | 5.0:1 | 7,052 |
| Comparative Example 27 | 5.0:1 | 5.0:1 | 7,001 |
| Comparative Example 28 | 5.0:1 | 5.0:1 | 7,112 |
| Comparative Example 29 | 5.0:1 | 5.0:1 | 6,016 |

TABLE 13-continued

| | | | |
|---|---|---|---|
| Comparative Example 30 | 5.0:1 | 5.0:1 | 3,054 |
| Comparative Example 31 | 5.0:1 | 5.0:1 | 5,402 |
| Comparative Example 32 | 5.0:1 | 5.0:1 | 7,322 |
| Comparative Example 33 | 5.0:1 | 5.0:1 | 6,656 |

TABLE 14

Properties of magnetic recording medium

| Examples | Thickness of magnetic layer ($\mu$m) | Coercive force value (kA/m) | (Oe) | Squareness (Br/Bm) (–) |
|---|---|---|---|---|
| Example 40 | 1.0 | 156.5 | 1,967 | 0.88 |
| Example 41 | 1.0 | 156.0 | 1,960 | 0.88 |
| Example 42 | 1.0 | 155.8 | 1,958 | 0.89 |
| Example 43 | 1.0 | 156.5 | 1,966 | 0.89 |
| Example 44 | 1.0 | 75.4 | 948 | 0.89 |
| Example 45 | 1.0 | 75.8 | 952 | 0.90 |
| Example 46 | 1.1 | 137.5 | 1,728 | 0.88 |
| Example 47 | 1.0 | 156.1 | 1,961 | 0.91 |
| Example 48 | 1.1 | 74.8 | 940 | 0.90 |
| Example 49 | 1.0 | 70.9 | 891 | 0.89 |
| Example 50 | 1.0 | 156.2 | 1,963 | 0.89 |
| Example 51 | 1.0 | 75.8 | 952 | 0.89 |

Properties of magnetic recording medium

| Examples | Gloss (%) | Surface roughness Ra (nm) | Young's modulus (relative value) |
|---|---|---|---|
| Example 40 | 221 | 6.4 | 136 |
| Example 41 | 236 | 5.8 | 134 |
| Example 42 | 230 | 6.0 | 134 |
| Example 43 | 234 | 6.0 | 135 |
| Example 44 | 193 | 6.3 | 140 |
| Example 45 | 190 | 6.3 | 140 |
| Example 46 | 181 | 7.8 | 142 |
| Example 47 | 213 | 6.0 | 135 |
| Example 48 | 206 | 5.8 | 141 |
| Example 49 | 184 | 7.3 | 143 |
| Example 50 | 215 | 6.0 | 134 |
| Example 51 | 196 | 6.0 | 132 |

Properties of magnetic recording medium

| | | Durability | |
|---|---|---|---|
| Examples | Surface resistivity value ($\Omega$/cm$^2$) | Durability time (min.) | Head cleaning property (–) |
| Example 40 | $2.4 \times 10^9$ | 27.9 | A |
| Example 41 | $1.8 \times 10^9$ | 28.8 | A |
| Example 42 | $1.2 \times 10^9$ | 29.8 | A |
| Example 43 | $2.9 \times 10^9$ | ≧30 | A |
| Example 44 | $2.5 \times 10^9$ | ≧30 | A |
| Example 45 | $4.4 \times 10^9$ | 28.9 | A |
| Example 46 | $9.6 \times 10^8$ | 26.6 | B |
| Example 47 | $3.4 \times 10^9$ | ≧30 | A |
| Example 48 | $3.8 \times 10^9$ | ≧30 | A |
| Example 49 | $1.6 \times 10^9$ | ≧30 | B |
| Example 50 | $3.1 \times 10^9$ | 27.6 | A |
| Example 51 | $4.3 \times 10^9$ | 25.1 | A |

TABLE 15

Properties of magnetic recording medium

| Examples | Thickness of magnetic layer ($\mu$m) | Coercive force value (kA/m) | (Oe) | Squareness (Br/Bm) (–) |
|---|---|---|---|---|
| Example 52 | 1.1 | 157.3 | 1,976 | 0.88 |
| Example 53 | 1.2 | 157.6 | 1,981 | 0.89 |
| Example 54 | 1.1 | 157.5 | 1,979 | 0.89 |
| Example 55 | 1.1 | 140.1 | 1,760 | 0.89 |
| Example 56 | 1.0 | 76.6 | 963 | 0.90 |
| Example 57 | 1.1 | 140.5 | 1,765 | 0.88 |
| Example 58 | 1.0 | 76.8 | 965 | 0.89 |
| Example 59 | 1.1 | 70.7 | 889 | 0.90 |
| Example 60 | 1.0 | 157.4 | 1,978 | 0.89 |
| Example 61 | 1.1 | 76.9 | 966 | 0.90 |

Properties of magnetic recording medium

| Examples | Gloss (%) | Surface roughness Ra (nm) | Young's modulus (relative value) |
|---|---|---|---|
| Example 52 | 230 | 6.2 | 133 |
| Example 53 | 236 | 6.0 | 134 |
| Example 54 | 233 | 6.2 | 133 |
| Example 55 | 221 | 6.4 | 136 |
| Example 56 | 191 | 6.6 | 141 |
| Example 57 | 240 | 5.8 | 134 |
| Example 58 | 198 | 6.2 | 140 |
| Example 59 | 196 | 6.3 | 138 |
| Example 60 | 220 | 5.9 | 140 |
| Example 61 | 200 | 6.1 | 139 |

Properties of magnetic recording medium

| | | Durability | |
|---|---|---|---|
| Examples | Surface resistivity value ($\Omega$/cm$^2$) | Durability time (min.) | Head cleaning property (–) |
| Example 52 | $3.6 \times 10^9$ | 27.8 | A |
| Example 53 | $2.1 \times 10^9$ | 30↑ | A |
| Example 54 | $3.2 \times 10^9$ | 27.2 | B |
| Example 55 | $1.8 \times 10^9$ | 30↑ | A |
| Example 56 | $6.5 \times 10^9$ | 28.9 | B |
| Example 57 | $8.9 \times 10^8$ | 30↑ | A |
| Example 58 | $1.6 \times 10^9$ | 29.6 | A |
| Example 59 | $4.4 \times 10^9$ | 28.1 | A |
| Example 60 | $2.3 \times 10^9$ | 28.9 | A |
| Example 61 | $6.8 \times 10^9$ | 30↑ | A |

TABLE 16

Properties of magnetic recording medium

| Comparative Examples | Thickness of magnetic layer ($\mu$m) | Coercive force value (kA/m) | (Oe) | Squareness (Br/Bm) (–) |
|---|---|---|---|---|
| Comparative Example 22 | 1.0 | 154.3 | 1,939 | 0.82 |
| Comparative Example 23 | 1.0 | 154.6 | 1,943 | 0.82 |
| Comparative Example 24 | 1.0 | 154.5 | 1,941 | 0.81 |
| Comparative Example 25 | 1.1 | 152.0 | 1,910 | 0.83 |

TABLE 16-continued

| Comparative Example | | | |
|---|---|---|---|
| Comparative Example 26 | 1.0 | 154.5 | 1,942 | 0.84 |
| Comparative Example 27 | 1.2 | 155.1 | 1,949 | 0.78 |
| Comparative Example 28 | 1.1 | 155.6 | 1,955 | 0.80 |
| Comparative Example 29 | 1.1 | 154.6 | 1,943 | 0.85 |
| Comparative Example 30 | 1.2 | 75.0 | 943 | 0.87 |
| Comparative Example 31 | 1.1 | 154.8 | 1,945 | 0.84 |
| Comparative Example 32 | 1.0 | 154.9 | 1,946 | 0.83 |
| Comparative Example 33 | 1.1 | 154.5 | 1,942 | 0.84 |

| | Properties of magnetic recording medium | | |
|---|---|---|---|
| Comparative Examples | Gloss (%) | Surface roughness Ra (nm) | Young's modulus (relative value) |
| Comparative Example 22 | 164 | 28.3 | 126 |
| Comparative Example 23 | 174 | 19.3 | 125 |
| Comparative Example 24 | 172 | 21.6 | 123 |
| Comparative Example 25 | 158 | 33.6 | 111 |
| Comparative Example 26 | 171 | 20.8 | 118 |
| Comparative Example 27 | 172 | 21.0 | 123 |
| Comparative Example 28 | 164 | 17.6 | 116 |
| Comparative Example 29 | 168 | 24.6 | 121 |
| Comparative Example 30 | 180 | 9.6 | 129 |
| Comparative Example 31 | 176 | 19.4 | 122 |
| Comparative Example 32 | 173 | 21.2 | 123 |
| Comparative Example 33 | 172 | 18.2 | 121 |

| | Properties of magnetic recording medium | | |
|---|---|---|---|
| | | Durability | |
| Comparative Examples | Surface resistivity value ($\Omega/cm^2$) | Durability time (min.) | Head cleaning property (-) |
| Comparative Example 22 | $3.6 \times 10^9$ | 16.5 | C |
| Comparative Example 23 | $2.9 \times 10^9$ | 13.6 | C |
| Comparative Example 24 | $1.6 \times 10^9$ | 6.4 | D |
| Comparative Example 25 | $4.8 \times 10^9$ | 13.2 | D |
| Comparative Example 26 | $3.2 \times 10^9$ | 15.6 | C |
| Comparative Example 27 | $3.4 \times 10^9$ | 12.1 | C |
| Comparative Example 28 | $3.3 \times 10^9$ | 14.4 | D |
| Comparative Example 29 | $3.8 \times 10^{11}$ | 6.5 | C |
| Comparative Example 30 | $2.2 \times 10^9$ | 15.7 | C |
| Comparative Example 31 | $6.3 \times 10^9$ | 14.2 | C |
| Comparative Example 32 | $3.9 \times 10^9$ | 15.3 | D |
| Comparative Example 33 | $6.5 \times 10^9$ | 13.9 | D |

What is claimed is:

1. A non-magnetic substrate for magnetic recording medium, comprising:

a base film; and a non-magnetic undercoat layer formed on said base film, comprising a binder resin and non-magnetic composite particles having an average particle size of 0.01 to 0.3 µm, the non-magnetic composite particles comprising:

non-magnetic particles as core particles; and inorganic fine particles having an average particle size of 0.001 to 0.07 µm, which are present on the surface of each non-magnetic particle, and consist of at least one inorganic compound selected from the group consisting of oxides, nitrides, carbides and sulfides of an element selected from the group consisting of an aluminum element, zirconium element, cerium element, titanium element, silicon element, boron element and molybdenum element, said inorganic fine particles being fixed or anchored on the surface of each non-magnetic particle through a silicon compound derived from tetraalkoxysilanes and the amount of said inorganic fine particles being 0.1 to 20% by weight based on the weight of said non-magnetic particles.

2. A non-magnetic substrate according to claim 1, which further has a gloss of 176 to 300% and a surface roughness of 0.5 to 8.5 nm.

3. A non-magnetic substrate according to claim 1, wherein said non-magnetic composite particles comprise:

said non-magnetic particles as core particles;

an undercoat formed on the surface of each non-magnetic particle as core particle and comprising at least one compound selected from the group consisting of a hydroxide of aluminum, an oxide of aluminum, a hydroxide of silicon and an oxide of silicon; and said inorganic fine particles which are present on said undercoat, and consist of at least one inorganic compound selected from the group consisting of oxides, nitrides, carbides and sulfides of an element selected from the group consisting of an aluminum element, zirconium element, cerium element, titanium element, silicon element, boron element and molybdenum element, said inorganic fine particles being fixed or anchored on the surface of each non-magnetic particle through a silicon compound derived from tetraalkoxysilanes.

4. A magnetic recording medium comprising:

a non-magnetic base film;

a non-magnetic undercoat layer formed on said base film, comprising a binder resin and non-magnetic composite particles, and a magnetic recording layer formed on said non-magnetic undercoat layer, comprising magnetic particles and a binder resin, the non-magnetic composite particles having an average particle size of 0.01 to 0.3 µm, comprising:

non-magnetic particles as core particles; and inorganic fine particles having an average particle size of 0.001 to 0.07 µm, which are present on the surface of each non-magnetic particle, and consist of at least one inorganic compound selected from the group consisting of oxides, nitrides, carbides and sulfides of an element selected from the group consisting of an aluminum element, zirconium element, cerium element, titanium element, silicon element, boron element and molybdenum element, said inorganic fine particles being fixed or anchored on the surface of each non-magnetic particle through a silicon compound derived from tetraalkoxysilanes and the amount of said inorganic fine particles being 0.1 to 20% by weight based on the weight of said non-magnetic particles.

5. A magnetic recording medium according to claim 4, wherein said non-magnetic composite particles comprise:

said non-magnetic particles as core particles;

an undercoat formed on the surface of each non-magnetic particle as core particle and comprising at least one compound selected from the group consisting of a hydroxide of aluminum, an oxide of aluminum, a hydroxide of silicon and an oxide of silicon; and said inorganic fine particles which are present on said undercoat, and consist of at least one inorganic compound selected from the group consisting of oxides, nitrides, carbides and sulfides of an element selected from the group consisting of an aluminum element, zirconium element, cerium element, titanium element, silicon element, boron element and molybdenum element, said inorganic fine particles being fixed or anchored on the surface of each non-magnetic particle through a silicon compound derived from tetraalkoxysilanes.

6. A magnetic recording medium according to claim 4, which further has a coercive force value of 500 to 4,000 Oe, a squareness of 0.85 to 0.95, a gloss of 170 to 300%, a surface roughness of not more than 11.5 nm and a running durability of not less than 22 minutes.

* * * * *